United States Patent [19]
Kittaka et al.

[11] Patent Number: 5,999,975
[45] Date of Patent: Dec. 7, 1999

[54] ON-LINE INFORMATION PROVIDING SCHEME FEATURING FUNCTION TO DYNAMICALLY ACCOUNT FOR USER'S INTEREST

[75] Inventors: Hiroyuki Kittaka; Osamu Akashi; Hideaki Suzuki; Terunao Soneoka; Naoyuki Satoh, all of Tokyo, Japan

[73] Assignee: Nippon Telegraph and Telephone Corporation, Tokyo, Japan

[21] Appl. No.: 09/035,208

[22] Filed: Mar. 5, 1998

[30] Foreign Application Priority Data

Mar. 28, 1997 [JP] Japan .................................. 9-077694
Jan. 28, 1998 [JP] Japan .................................. 10-016179

[51] Int. Cl.⁶ .................................................. G06F 13/00
[52] U.S. Cl. ........................ 709/224; 709/217; 709/218; 709/223
[58] Field of Search .................................... 709/217, 218, 709/223, 224, 226, 248; 707/10

[56] References Cited

U.S. PATENT DOCUMENTS 5,682,428  10/1997  Johnson .................................... 380/23
5,767,848  6/1998   Matsuzaki et al. ...................... 345/331
5,790,785  8/1998   Klug et al. .............................. 713/202
5,796,393  8/1998   MacNaughton et al. ............... 345/329
5,806,068  9/1998   Shaw et al. ............................. 707/103
5,848,131  12/1998  Shaffer et al. ......................... 379/67.1
5,867,799  2/1999   Lang et al. .................................. 707/1
5,887,139  3/1999   Madison, Jr. et al. ................... 709/223
5,923,845  7/1999   Kamiya et al. ....................... 379/93.15

OTHER PUBLICATIONS

Fréléchoux and Kamba. "A User Profile Management Agent." Information Processing Society of Japan Research Report 97–HI–70–1, vol. 97, No. 2, pp. 1–8 (Jan. 16, 1997). (English Abstract).

Kamba. "The Krakatoa Chronicle: A Highly Interactive, Personalized Newspaper on the WWW." Information Processing Society of Japan Research Report 95–OS–71–3, 95–DPS–73–3, vol. 95, NO. 115, pp. 13–18 (Nov. 30, 1995). (English Abstract).

Sumita and Miike . "Information Filtering." Toshiba Review, vol. 51, No. 1, pp. 42–44 (Jan. 1, 1996). (English Abstract).

Sugai and Wada. "Information Filtering for Eletronic Newspapers on the World–Wide Web and Its Evaluation." Information Processing Society of Japan Research Report 96–FI–43–13, vol. 96, No. 88, pp. 89–96 (Sep. 12, 1996). (English Abstract).

(List continued on next page.)

Primary Examiner—Frank J. Asta
Assistant Examiner—Jason D. Cardone
Attorney, Agent, or Firm—Jones & Askew

[57] ABSTRACT

An on-line information providing scheme capable of dynamically accounting for user's interest with respect to information and providing appropriate information presentation according to the user's interest. An information provider device updates the information attribute value of the specified information and a user attribute value of the user by reflecting the information attribute value and the user attribute value with each other so as to dynamically update the user's interest and an information characteristic of the specified information, and selects a first set of information according to the user's interest by matching an updated user attribute value with the information attribute value of each information, and a second set of information according to the user's interest by matching an updated information attribute value of the specified information with the information attribute value of each other information. The specified information and an information list containing at least one of the first set of information and the second set of information are then transmitted from the information provider device to the information user device.

87 Claims, 13 Drawing Sheets

OTHER PUBLICATIONS

Nakashima et al. "Cooperation in News Filtering Agent." Information Processing Society of Japan Workshop Proceedings, vol. 95, No. 2, pp. 63–69 (Oct. 25, 1995). (English Abstract).

Kittaka et al. "Evaluation of Personal–Adapted Information Filtering System: InfoBroket." Information Processing Society of Japan $55^{th}$ (1997 second half) National Meeting Proceedings (3), pp. 234–235 (Sep. 24, 1997). (English Abstract).

Kittaka et al. "Interactive–Marketing on the Internet." Information Processing Society of Japan $54^{th}$ (1997 first half) National Meeting Proceedings (3), pp. 311–312 (Mar. 12, 1997). (English Abstract).

USER ATTRIBUTE VALUE  $U(u1, u2, ... un)$

INFORMATION ATTRIBUTE VALUE  $G(g1, g2, ... gn)$

FIG. 9A  UPDATE OF USER VECTOR
FIG. 9B  UPDATE OF INFORMATION VECTOR
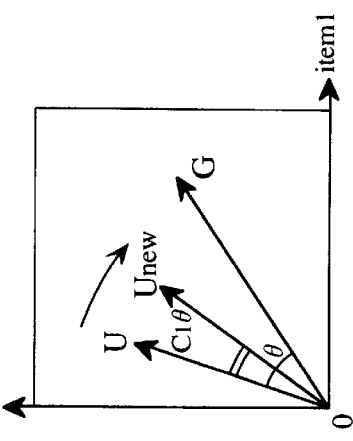
FIG. 9C  UPDATE OF USER VECTOR (ACTUAL CALCULATION)
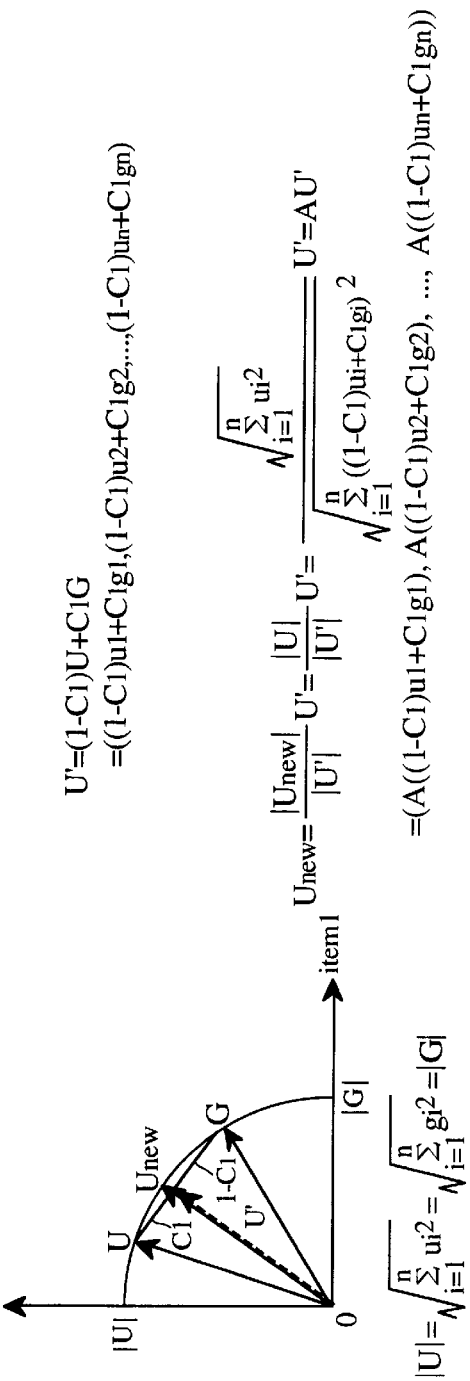
$$U' = (1-C_1)U + C_1G$$
$$= ((1-C_1)u_1 + C_1g_1, (1-C_1)u_2 + C_1g_2, \ldots, (1-C_1)u_n + C_1g_n)$$
$$U_{new} = \frac{|U_{new}|}{|U'|} U' = \frac{|U|}{|U'|} U' = \frac{\sqrt{\sum_{i=1}^{n} u_i^2}}{\sqrt{\sum_{i=1}^{n} ((1-C_1)u_i + C_1g_i)^2}} U' = AU'$$
$$= (A((1-C_1)u_1 + C_1g_1), A((1-C_1)u_2 + C_1g_2), \ldots, A((1-C_1)u_n + C_1g_n))$$
$$|U| = \sqrt{\sum_{i=1}^{n} u_i^2} = \sqrt{\sum_{i=1}^{n} g_i^2} = |G|$$

ON-LINE INFORMATION PROVIDING SCHEME FEATURING FUNCTION TO DYNAMICALLY ACCOUNT FOR USER'S INTEREST

BACKGROUND OF THE INVENTION

1. Field of the Invention

The present invention relates to a scheme for providing information on-line between an information user device located at a user side and an information provider device located at an information provider side which is connected with the information user device through a network.

2. Description of the Background Art

An information presentation system accounting for user's interest can be realized by using WWW as a communication platform and dynamically creating HTML sentences for each user in terms of CGI script.

In order to provide information presentation accounting for user's interest in this system, a user initially makes a membership registration to an information provider side, and then registers information fields of his/her own interest to the information provider side by way of submitting replies to a questionnaire. The information provider then stores in a user DB (database) an information indicating the user's interest (user attribute value) in correspondence to a user ID.

Also, the information provider classifies individual information according to its information field, and sets up an information indicating the information field (information attribute value) and stores it in an information DB in advance.

When the user makes an access to the information provider, the user's user ID is sent to the information provider. The information provider retrieves the user attribute value corresponding to the received user ID from the user DB, and selects and provides a set of information which is expected to suit the user's interest best by comparing the retrieved user attribute value with the information attribute value of each information registered in the information DB.

In the above described conventional system, there is a need for the user to acquire a membership at the information provider side and registers the user attribute value to the information provider side prior to system utilization and there is a problem that this user attribute value set up is tedious. In addition, the registered user attribute value will not be changed until the set up is made again so that there is a problem that the registered user attribute value cannot follow the change in the user's interest. Also, the user attribute values of all the users are to be managed at the information provider side so that there is a problem that a processing load on the information provider become large.

Moreover, there is a need for the information provider to set up information attribute values for all information in order to classify information and there is a problem that this information attribute value set up is tedious. In addition, the information attribute value set up is to be carried out arbitrarily by the information provider so that there is a problem that the set up is not made again automatically even when a current information attribute value is not appropriate from a viewpoint of the user.

Furthermore, when the user makes an access to the information provider, the information provider can easily identify the user because the user ID is to be sent to the information provider so that there is a problem regarding protection of privacy of the user.

SUMMARY OF THE INVENTION

It is therefore an object of the present invention to provide an on-line information providing scheme capable of dynamically accounting for user's interest with respect to information and providing appropriate information presentation according to the user's interest.

According to one aspect of the present invention there is provided a method for providing information on-line between an information user device located at a user side and an information provider device located at an information provider side which is connected with the information user device through a network, the method comprising the steps of: storing an information attribute value that indicates an information characteristic of each information numerically in correspondence to an information ID of each information in the information provider device; sending an information ID of a specific information from the information user device to the information provider device in a case where a user makes an access through the information user device to the specific information selected out of a list of information presented by the information provider; updating the information attribute value of the specific information corresponding to the information ID of the specific information and a user attribute value of the user that indicates a user's interest with respect to information numerically by reflecting the information attribute value and the user attribute value with each other so as to dynamically update the user's interest and an information characteristic of the specific information, upon receiving the information ID of the specific information at the information provider device; selecting a first set of information according to the user's interest by matching an updated user attributed value with the information attribute value of each information at the information provider device, and a second set of information according to the user's interest by matching an updated information attribute value of the specific information with the information attribute value of each other information at the information provider device; transmitting the specific information and an information list containing at least one of the first set of information and the second set of information from the information provider device to the information user device; and presenting the specific information and the information list to the user at the information user device upon receiving the specific information and the information list from the information provider device.

According to another aspect of the present invention there is provided a system for providing information on-line between an information user device located at a user side and an information provider device located at an information provider side which is connected with the information user device through a network, the system comprising: the information user device having an information display unit for sending to the information provider device through the network an information ID of a specific information selected out of a list of information presented by the information provider, receiving the specific information and an information list selected according to a user's interest by the information provider device which are transmitted from the information provider device in response, and displaying the specific information and the information list to a user; and the information provider device having: an information attribute storage unit for storing an information attribute value that indicates an information characteristic of each information numerically in correspondence to an information ID of each information; an information selection unit for reading from the information attribute storage unit an information attribute value of the specific information corresponding to the information ID of the specific information sent from the information user device, updating the information attribute value of the specific information and a user attribute value of the user that indicates a user's interest with respect to information numerically by reflecting the information attribute value and the user attribute value with each other so as to dynamically update the user's interest and an information characteristic of the specific information, selecting a first set of information according to the user's interest by matching an updated user attributed value with the information attribute value of each information, and selecting a second set of information according to the user's interest by matching an updated information attribute value of the specific information with the information attribute value of each other information; and an information providing unit for transmitting the specific information and the information list containing at least one of the first set of information and the second set of information to the information user device through the network.

According to another aspect of the present invention there is provided an article of manufacture, comprising: a computer usable medium having computer readable program code means embodied therein for causing a computer to function as a system for providing information on-line between an information user device located at a user side and an information provider device located at an information provider side which is connected with the information user device through a network, the computer readable program code means includes: first computer readable program code means for causing said computer to control the information user device such that the information user device sends to the information provider device through the network an information ID of a specific information selected out of a list of information presented by the information provider, receives the specific information and an information list selected according to a user's interest by the information provider device which are transmitted from the information provider device in response, and displays the specific information and the information list to a user; and second computer readable program code means for causing said computer to control the information provider device such that the information provider device stores an information attribute value that indicates an information characteristic of each information numerically in correspondence to an information ID of each information, reads an information attribute value of the specific information corresponding to the information ID of the specific information sent from the information user device, updates the information attribute value of the specific information and a user attribute value of the user that indicates a user's interest with respect to information numerically by reflecting the information attribute value and the user attribute value with each other so as to dynamically update the user's interest and an information characteristic of the specific information, selects a first set of information according to the user's interest by matching an updated user attributed value with the information attribute value of each information, selects a second set of information according to the user's interest by matching an updated information attribute value of the specific information with the information attribute value of each other information, and transmits the specific information and the information list containing at least one of the first set of information and the second set of information to the information user device through the network.

According to another aspect of the present invention there is provided a method for providing information at an information providing device at a time of providing information on-line between an information user device located at a user side and the information provider device located at an information provider side which is connected with the information user device through a network, the method comprising the steps of: storing an information attribute value that indicates an information characteristic of each information numerically in correspondence to an information ID of each information; receiving an information ID of a specific information sent from the information user device to the information provider device in a case where a user makes an access through the information user device to the specific information selected out of a list of information presented by the information provider; updating the information attribute value of the specific information corresponding to the information ID of the specific information and a user attribute value of the user that indicates a user's interest with respect to information numerically by reflecting the information attribute value and the user attribute value with each other so as to dynamically update the user's interest and an information characteristic of the specific information; selecting a first set of information according to the user's interest by matching an updated user attributed value with the information attribute value of each information, and a second set of information according to the user's interest by matching an updated information attribute value of the specific information with the information attribute value of each other information; and transmitting the specific information and an information list containing at least one of the first set of information and the second set of information from the information provider device to the information user device.

According to another aspect of the present invention there is provided an information provider device in a system for providing information on-line between an information user device located at a user side and the information provider device located at an information provider side which is connected with the information user device through a network, the information provider device comprising: an information attribute storage unit for storing an information attribute value that indicates an information characteristic of each information numerically in correspondence to an information ID of each information; an information selection unit for reading from the information attribute storage unit an information attribute value of the specific information corresponding to an information ID of the specific information sent from the information user device to the information provider device in a case where a user makes an access through the information user device to the specific information selected out of a list of information presented by the information provider, updating the information attribute value of the specific information and a user attribute value of the user that indicates a user's interest with respect to information numerically by reflecting the information attribute value and the user attribute value with each other so as to dynamically update the user's interest and an information characteristic of the specific information, selecting a first set of information according to the user's interest by matching an updated user attributed value with the information attribute value of each information, and selecting a second set of information according to the user's interest by matching an updated information attribute value of the specific information with the information attribute value of each other information; and an information providing unit for transmitting the specific information and the information list containing at least one of the first set of information and the second set of information selected by the information selection unit to the information user device through the network.

According to another aspect of the present invention there is provided an article of manufacture, comprising: a computer usable medium having computer readable program code means embodied therein for causing a computer to function as an information provider device in a system for providing information on-line between an information user device located at a user side and the information provider device located at an information provider side which is connected with the information user device through a network, the computer readable program code means includes: first computer readable program code means for causing said computer to store an information attribute value that indicates an information characteristic of each information numerically in correspondence to an information ID of each information; second computer readable program code means for causing said computer to read an information attribute value of the specific information as stored by the first computer readable program code means which is corresponding to an information ID of the specific information sent from the information user device to the information provider device in a case where a user makes an access through the information user device to the specific information selected out of a list of information presented by the information provider, update the information attribute value of the specific information and a user attribute value of the user that indicates a user's interest with respect to information numerically by reflecting the information attribute value and the user attribute value with each other so as to dynamically update the user's interest and an information characteristic of the specific information, select a first set of information according to the user's interest by matching an updated user attributed value with the information attribute value of each information, and select a second set of information according to the user's interest by matching an updated information attribute value of the specific information with the information attribute value of each other information; and third computer readable program code means for causing said computer to transmit the specific information and the information list containing at least one of the first set of information and the second set of information selected by the second computer readable program code means to the information user device through the network.

Other features and advantages of the present invention will become apparent from the following description taken in conjunction with the accompanying drawings.

BRIEF DESCRIPTION OF THE DRAWINGS

FIGS. 9A, 9B and 9c are diagrams showing one example of a procedure for updating user vector and information vector of FIGS. 8A and 8B that can be used in the information providing system of FIG. 1.

DETAILED DESCRIPTION OF THE PREFERRED EMBODIMENTS

Referring now to FIG. 1 to FIG. 11, the first embodiment of an on-line information providing scheme according to the present invention will be described in detail.

Figure 1:
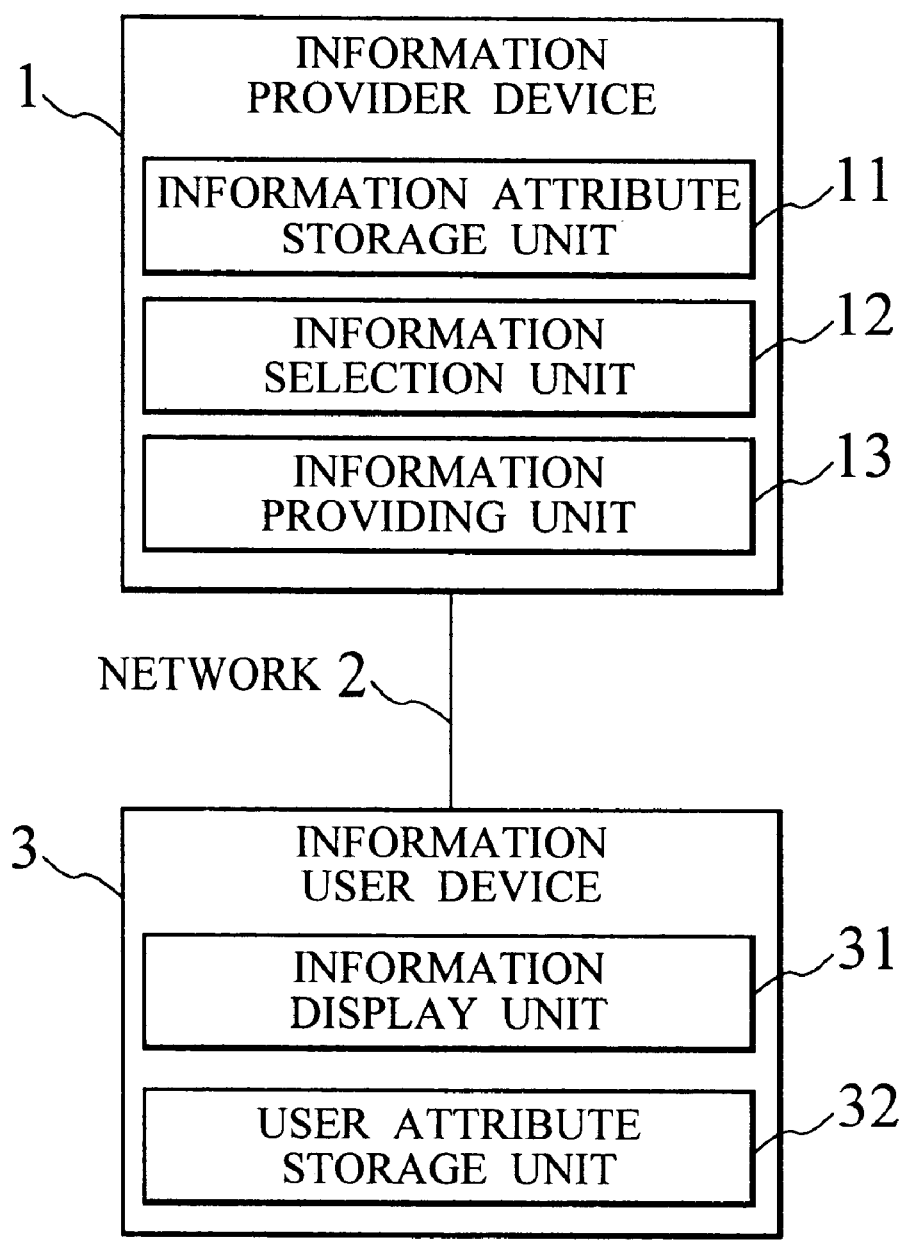
FIG. 1 is a block diagram of an information providing system for realizing an on-line information providing scheme according to the first embodiment of the present invention.

FIG. 1 shows a configuration of an information providing system for realizing an on-line information providing scheme according to the first embodiment, in which information presentation is to be provided on-line between an information provider device 1 located at an information provider side and an information user device 3 located at a user side which is connected with the information provider device 1 through a network 2.

The information provider device 1 comprises: an information attribute storage unit 11 for storing various information including an information attribute value that indicates a characteristic of each information numerically and an information ID that identify each information; an information providing unit 13 for transmitting a list of information that can be provided in response to an information presentation request from the information user device 3, receiving an information ID and a user attribute value transmitted from the information user device 3, and transmitting an information specified by the user, an updated user attribute value and an information list selected according to the user's interest, to the information user device 3 through the network 2; and an information selection unit 12 for reading the information attribute value corresponding to the information ID received at the information providing unit 13 from the information attribute storage unit 11, dynamically updating user's interest and information characteristic by updating the user attribute value and the information attribute value of the specified information in such a manner as to reflect the information attribute value and the user attribute value of the specified information with each other, and selecting a set of information according to the user's interest by matching the user attribute value and the information attribute value of the specified information with an information attribute value of each information.

The information user device 3 comprises: a user attribute storage unit 32 for storing the user attribute value that indicates the user's interest with respect to information numerically; and an information display unit 31 for making an information presentation request to the information provider device 1 through the network 2, receiving a list of information transmitted from the information provider device 1 through the network 2 in response to the information presentation request, transmitting the information ID of an information to be accessed which is selected from the list of information along with the user attribute value to the information provider device 1 through the network 2, receiving the specified information, the information list and the user attribute value that are transmitted from the information provider device 1 through the network 2, displaying the specified information and the information list to the user, and storing the user attribute value into the user attribute storage unit 32.

Figure 2:
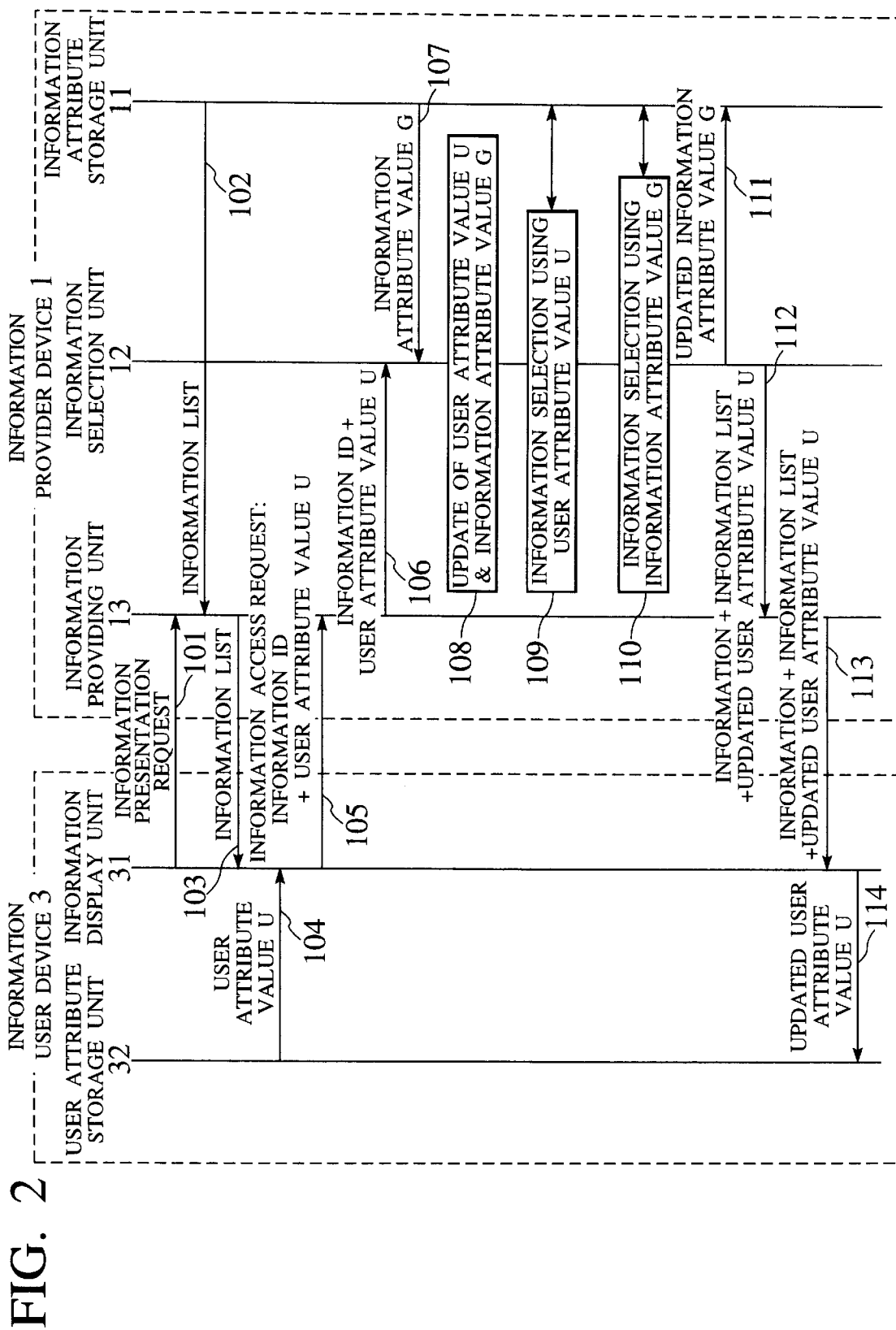
FIG. 2 is a sequence chart for the operation in the information providing system of FIG. 1.

Next, with reference to the sequence chart of FIG. 2, the operation in the information providing system of FIG. 1 will be described.

First, in order to make an access to an information, the user acquires the list of information provided from the information provider. To this end, the user requests the list of information from the information display unit 31 of the information user device 3 through the network 2 to the information providing unit 13 of the information provider device 1 (101). The information providing unit 13 receives this request and reads out from the information attribute storage unit 11 the list of information indicating information ID and description of each information that can be provided (102), and then returns this list of information to the information display unit 31 (103).

Next, the user determines an information to be accessed out of the list of information, and makes an information transmission request to the information provider. At this point, the information display unit 31 of the information user device 3 reads out a user attribute value U stored in the user attribute storage unit 32 (104), and sends the information ID of an information to be accessed and the read out user attribute value U to the information providing unit 13 of the information provider device 1 (105).

The information providing unit 13 then gives the received information ID and user attribute value U to the information selection unit 12 (106).

The information selection unit 12 obtains an information attribute value G of an information corresponding to the received information ID from the information attribute storage unit 11 (107), and then updates the user attribute value U that indicates the user's interest and the information attribute value G that indicates the information characteristic (108). This attribute value update is done by updating values set to items constituting these attribute values in such a manner as to reflect the user attribute value U and the information attribute value G of the specified information with each other, as will be described in further detail below.

Next, the information selection unit 12 selects a set of information that suits the user's interest, by using the updated user attribute value U (109). This information selection is done by selecting every information which has a distribution of values in the information attribute value that resembles the user attribute value U, as will be described in further detail below.

Next, the information selection unit 12 selects a set of information that is related to the specified information, by using the updated information attribute value G (110). This information selection is similarly done by selecting every information which has a distribution of values in the information attribute value that resembles the information attribute value G of the specified information, as will be described in further detail below.

In addition, the information selection unit 12 stores the updated information attribute value G into the information attribute storage unit 11 (111).

Then, the information specified by the user, the information list containing either one or both of the sets of information selected at the above described 109 and 110, and the updated user attribute value U are sent to the user from the information selection unit 12 through the information providing unit 13 and the information display unit 31 (112, 113).

Finally, the information display unit 31 stores the received updated user attribute value U into the user attribute storage unit 32 (114), while displaying the received information and information list to the user.

Next, with reference to FIGS. 3A and 3B, one example of the user attribute value and the information attribute value that can be used in the information providing system of FIG. 1 will be described.

Figure 3A:
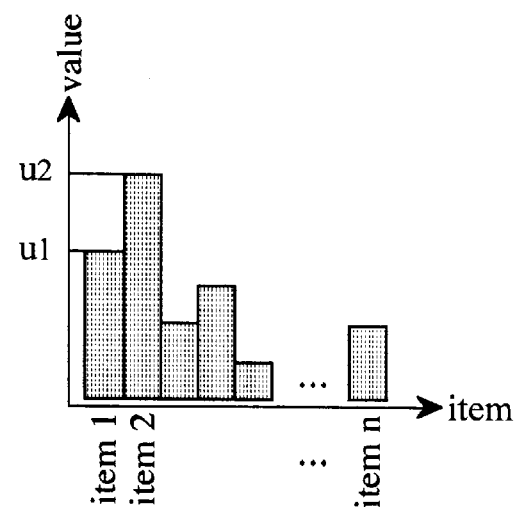
FIGS. 3A and 3B are diagrams showing one example of user attribute value and information attribute value that can be used in the information providing system of FIG. 1.
Figure 3B:
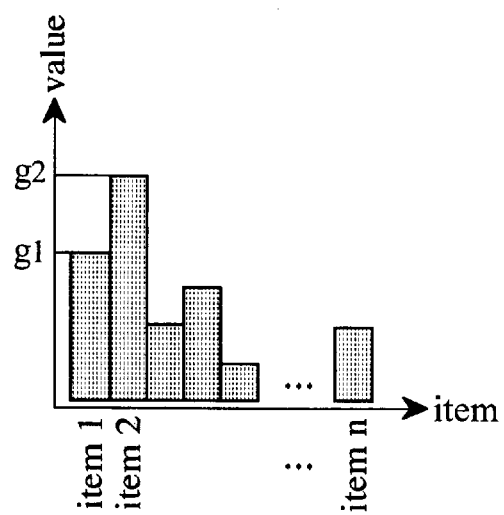

FIGS. 3A and 3B show exemplary configurations of the user attribute value and the information attribute value, respectively. Here, the user attribute value and the information attribute value are expressed as histograms in which intensities of the user's interest and the information characteristic are set as values of n pieces of prescribed common items, where the user attribute value is denoted as $U(u1, u2, \ldots, un)$ while the information attribute value is denoted as $G(g1, g2, \ldots, gn)$. This notation indicates that the user attribute value U has a value u1 for the first item and the information attribute value G has a value g1 for the first item, and so on.

Next, with reference to FIG. 4, one example of a procedure for updating the user attribute value and the information attribute value of FIGS. 3A and 3B that can be used in the information providing system of FIG. 1 will be described.

Figure 4:
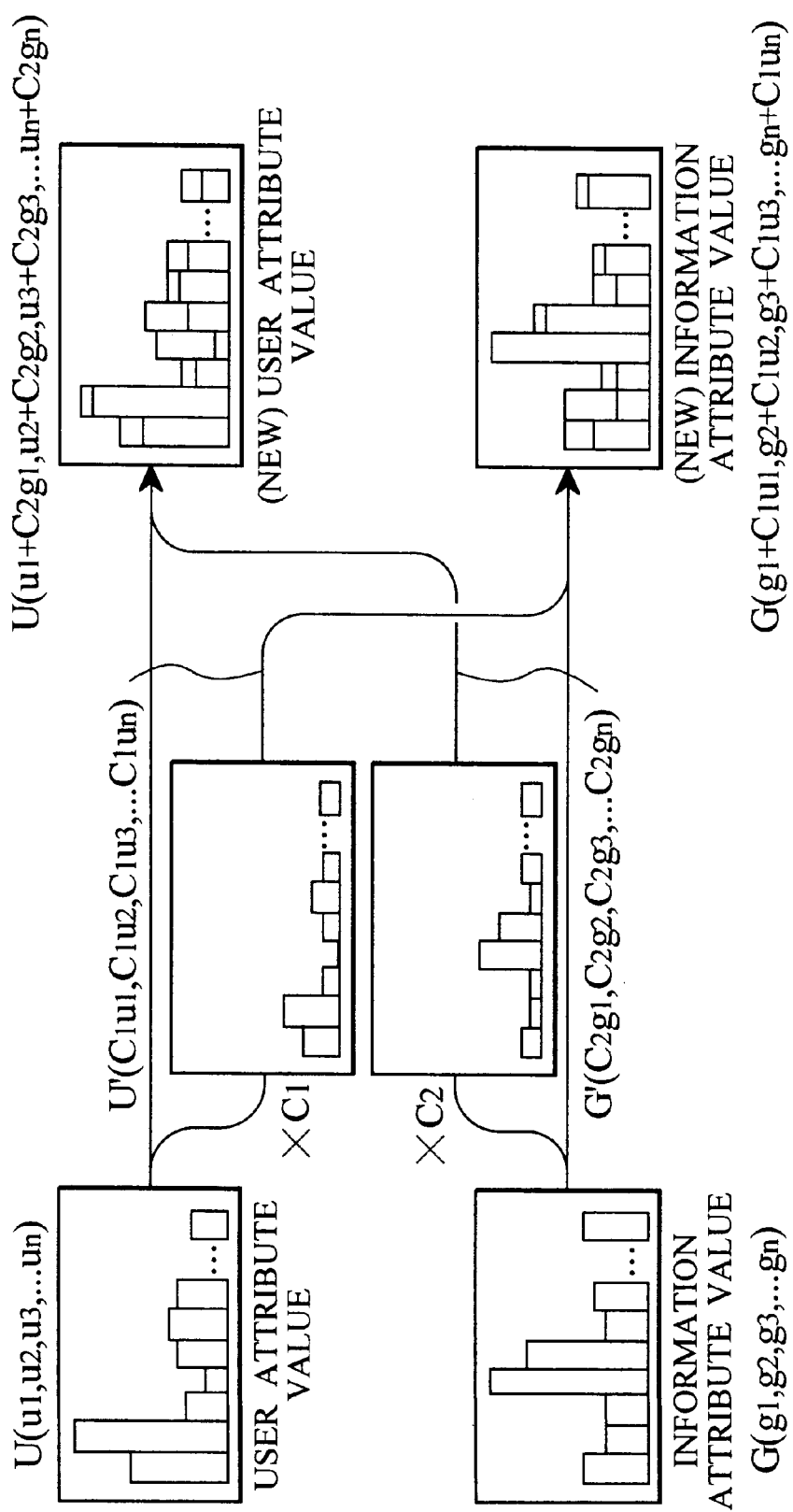
FIG. 4 is a diagram showing one example of a procedure for updating user attribute value and information attribute value of FIGS. 3A and 3B that can be used in the information providing system of FIG. 1.

The updating procedure shown in FIG. 4 realizes the update basically by adding values of these attribute values for each item. In FIG. 4, C1 and C2 are coefficients for preventing divergence, which are incorporated in order to prevent a diverging state, in which each value fluctuates largely at every occasion of updating and which tends to happen when values are added straightforwardly.

In FIG. 4, the user attribute value $U(u1, u2, \ldots, un)$ and the information attribute value $G(g1, g2, \ldots, gn)$ are multiplied by the coefficients C1 and C2, respectively, to yield $U'(C1u1, C1u2, C1u3, \ldots, C1un)$ and $G'(C2g1, C2g2, C2g3, \ldots, C2gn)$ which are then respectively added to the information attribute value $G(g1, g2, \ldots, gn)$ and the user attribute value $U(u1, u2, \ldots, un)$ item by item, to yield the updated user attribute values $U(u1+C2g1, u2+C2g2, u3+C2g3, \ldots, un+C2gn)$ and the updated information attribute value $G(g1+C1u1, g2+C1u2, g3+C1u3, \ldots, gn+C1un)$, respectively. In this manner, it is possible to dynamically update the user attribute value according to the user's interest while dynamically updating the information attribute value according to a change in the information characteristic.

Next, with reference to FIG. 5, another example of a procedure for updating the user attribute value and the information attribute value of FIGS. 3A and 3B that can be used in the information providing system of FIG. 1 will be described.

Figure 5:
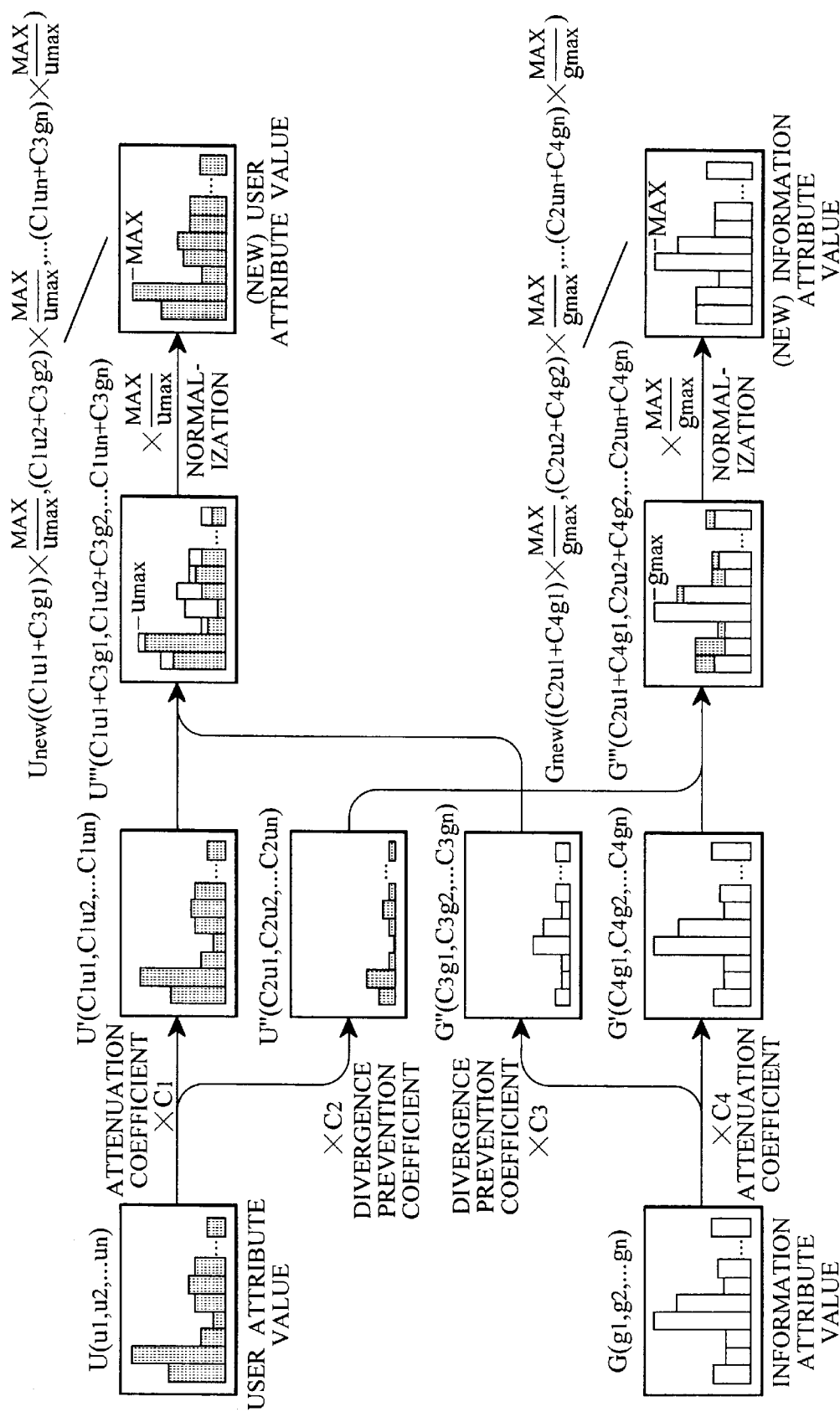
FIG. 5 is a diagram showing another example of a procedure for updating user attribute value and information attribute value of FIGS. 3A and 3B that can be used in the information providing system of FIG. 1.

The updating procedure shown in FIG. 5 realizes the update basically by multiplying these attribute values with coefficients and then adding obtained values for each item. In FIG. 5, C1, C2, C3 and C4 are coefficients to be multiplied with the attribute values.

C1 is an attenuation coefficient indicating a decline of interest, which is incorporated in order to account for the tendency of the user's interest to decline as time elapses. A value of each item constituting the user attribute value U is attenuated by multiplying this coefficient C1 in a range of $0<<C1<1$ so as to account for the fact that the transmitted user attribute value U indicates the user's interest in the past and the interest declines as time elapses.

C4 is an attenuation coefficient indicating a staleness of information, which is incorporated in order to account for the tendency of the information content to be provided to change as time elapses. A value of each item constituting the information attribute value G is attenuated by multiplying this coefficient C4 in a range of $0<<C4<1$ every time this information is accessed.

C2 and C3 are coefficients for preventing divergence, which are incorporated in order to prevent a diverging state, in which each value fluctuates largely at every occasion of updating and which tends to happen when values are added straightforwardly. To this end, the user attribute value U is multiplied by the coefficient C2 in a range of $0<C2<<1$ while the information attribute value G is multiplied by the coefficient C3 in a range of $0<C3<<1$ and then they are added to the information attribute value and the user attribute value, respectively.

In FIG. 5, the user attribute value $U(u1, u2, \ldots, un)$ is multiplied by the coefficient C1, to yield $U'(C1u1, C1u2, \ldots, C1un)$ which is then added with $G''(C3g1, C3g2, \ldots, C3gn)$ obtained by multiplying the information attribute value $G(g1, g2, \ldots, gn)$ with the coefficient C3, to yield the updated user attribute values $U(C1u1+C3g1, C1u2+C3g2, \ldots, C1un+C2gn)$. Similarly, the information attribute value $G(g1, g2, \ldots, gn)$ is multiplied by the coefficient C4, to yield $G'(C4g1, C4g2, \ldots, C4gn)$ which is then added with $U''(C2u1, C2u2, \ldots, C2un)$ obtained by multiplying the user attribute value $U(u1, u2, \ldots, un)$ with the coefficient C2, to yield the updated information attribute values $G(C2u1+C4g1, C2u2+C4g2, \ldots, C2un+C4gn)$. In this manner, it is possible to dynamically update the user attribute value according to the user's interest while dynamically updating the information attribute value according to a change in the information characteristic.

Note that, in FIG. 5, the normalization is further applied to these updated values. Namely, the value of each item constituting each attribute value does not have an absolute significance by itself, and it is only a relative value that has a significance upon comparison among items, so that it is more convenient to store a value of each item by normalizing it with respect to a predetermined maximum value, from a viewpoint of management as well as from a viewpoint of exchange of attribute value. For this reason, a new user attribute value is obtained by selecting an item with a value umax which is largest among values of the items constituting the updated user attribute value and normalizing all values of the items constituting the updated user attribute value with respect to the predetermined maximum value MAX such that the value umax of the selected item becomes equal to the predetermined maximum value MAX. Similarly, a new information attribute value is obtained by normalizing the updated information attribute value.

Next, with reference to FIG. 6, one example of a procedure for selecting a set of information that suits the user's interest, from N pieces of information that can be provided, by using the user attribute value U of FIG. 3A, will be described.

Figure 6:
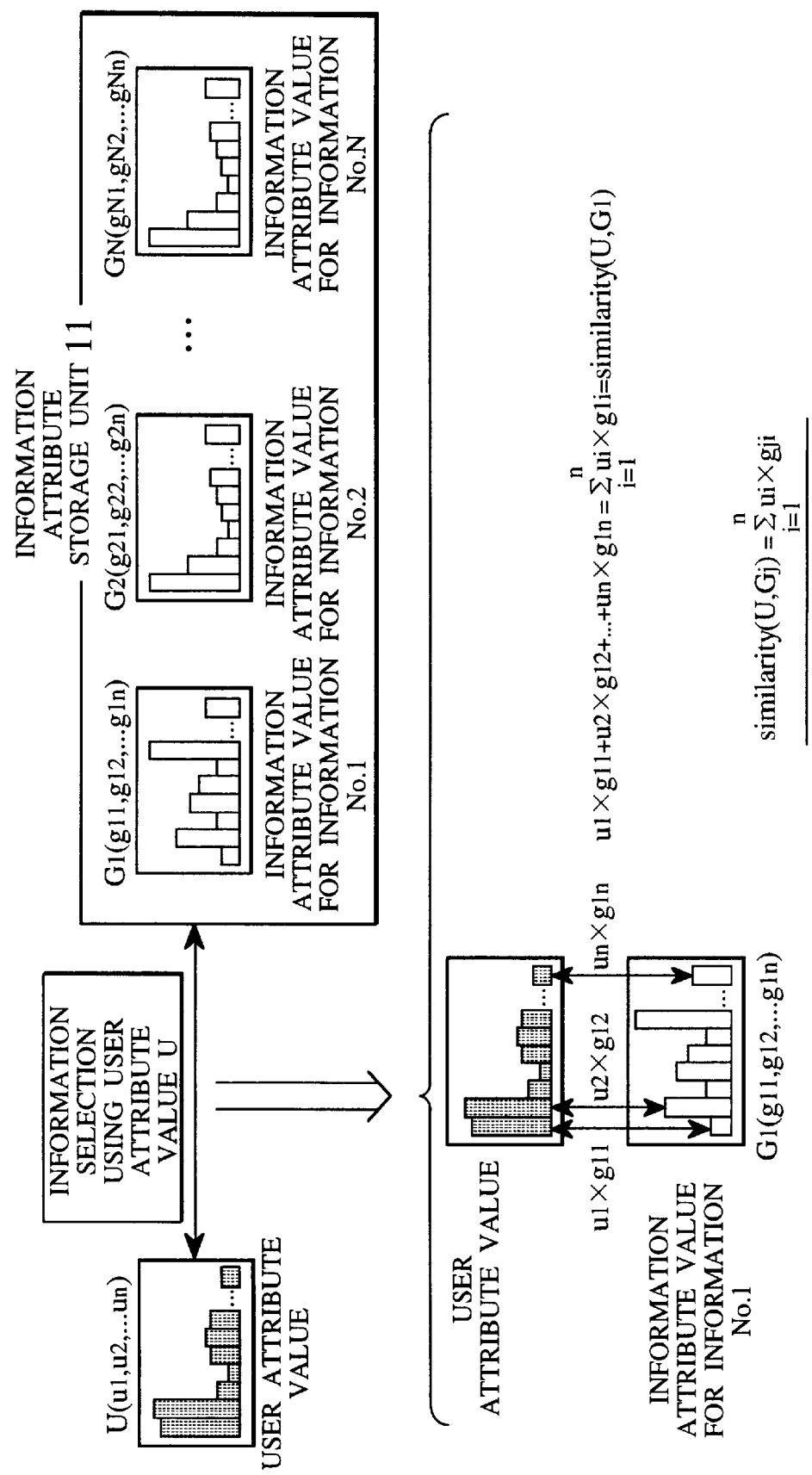
FIG. 6 is a diagram showing one example of a procedure for selecting information according to user attribute value of FIG. 3A that can be used in the information providing system of FIG. 1.

In the selection procedure shown in FIG. 6, the user attribute value and the information attribute value of each information are utilized in such a manner that the user attribute value and the information attribute value of each information are multiplied together item by item and obtained values for all the items are summed together, and then every information for which the similarity given by the obtained sum is greater than a prescribed value is selected, or a set of a prescribed number of information in a decreasing order of the similarity is selected. Note that the selection here may alternatively be made by selecting a prescribed number of information in a decreasing order of the similarity out of those information for which the similarity is greater than the prescribed value, or by selecting those information for which the similarity is greater than the prescribed value out of a prescribed number of information in a decreasing order of the similarity. In this manner, it is possible to select a set of information according to the user's interest.

Next, with reference to FIG. 7, one example of a procedure for selecting a set of information that is related to the information specified by the user, from N pieces of information that can be provided, by using the information attribute value G of FIG. 3B, will be described.

Figure 7:
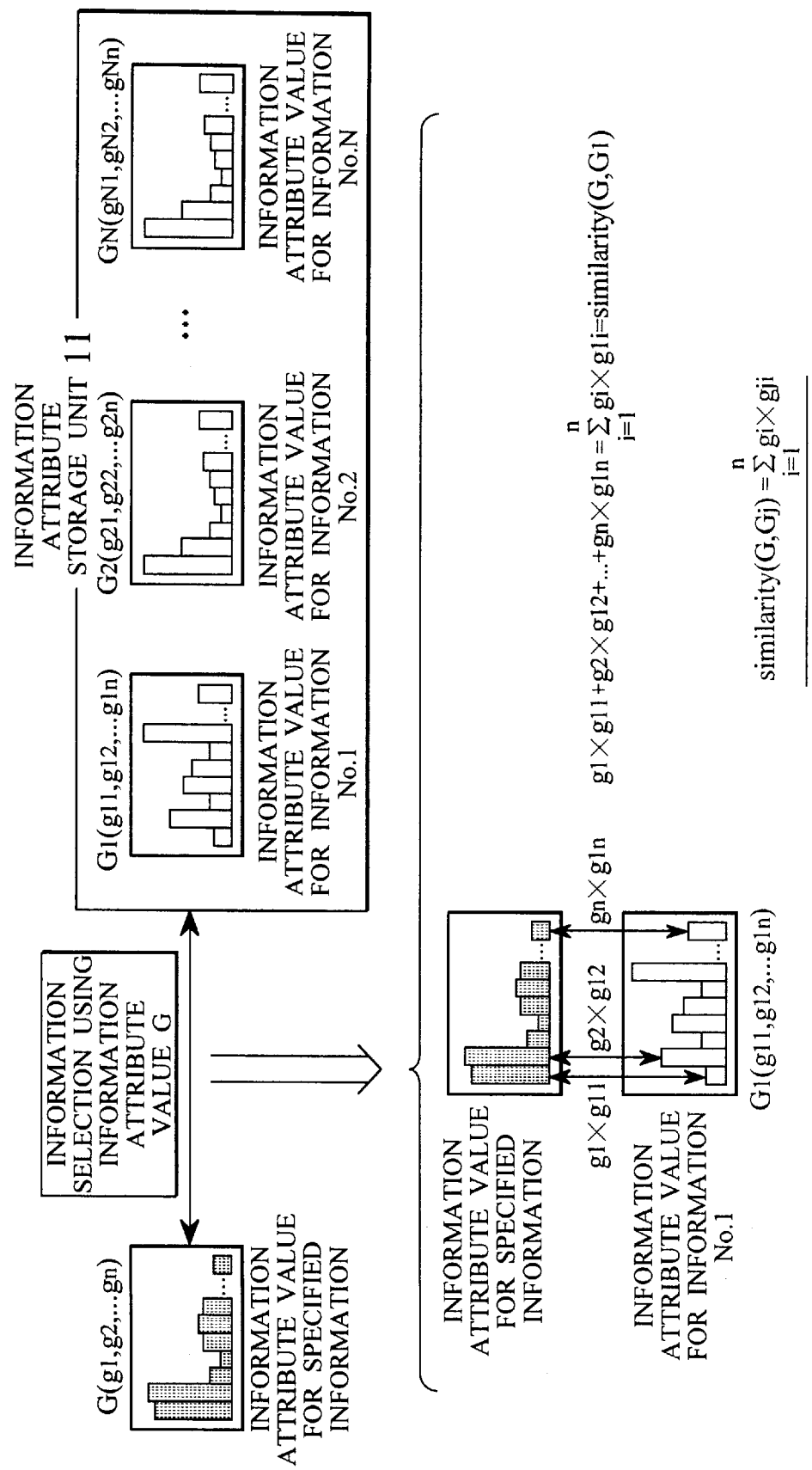
FIG. 7 is a diagram showing one example of a procedure for selecting information according to information attribute value of FIG. 3B that can be used in the information providing system of FIG. 1.

In the selection procedure shown in FIG. 7, the information attribute value of the specified information and the information attribute value of each other information are utilized in such a manner that the user attribute value of the specified information and the information attribute value of each other information are multiplied together item by item and obtained values for all the items are summed together, and then every information for which the similarity given by the obtained sum is greater than a prescribed value is selected, or a set of a prescribed number of information in a decreasing order of the similarity is selected. Note that the selection here may alternatively be made by selecting a prescribed number of information in a decreasing order of the similarity out of those information for which the similarity is greater than the prescribed value, or by selecting those information for which the similarity is greater than the prescribed value out of a prescribed number of information in a decreasing order of the similarity. In this manner, it is possible to select a set of information according to the user's interest.

Next, with reference to FIGS. 8A and 8B, another example of the user attribute value and the information attribute value that can be used in the information providing system of FIG. 1 will be described.

Figure 8A:
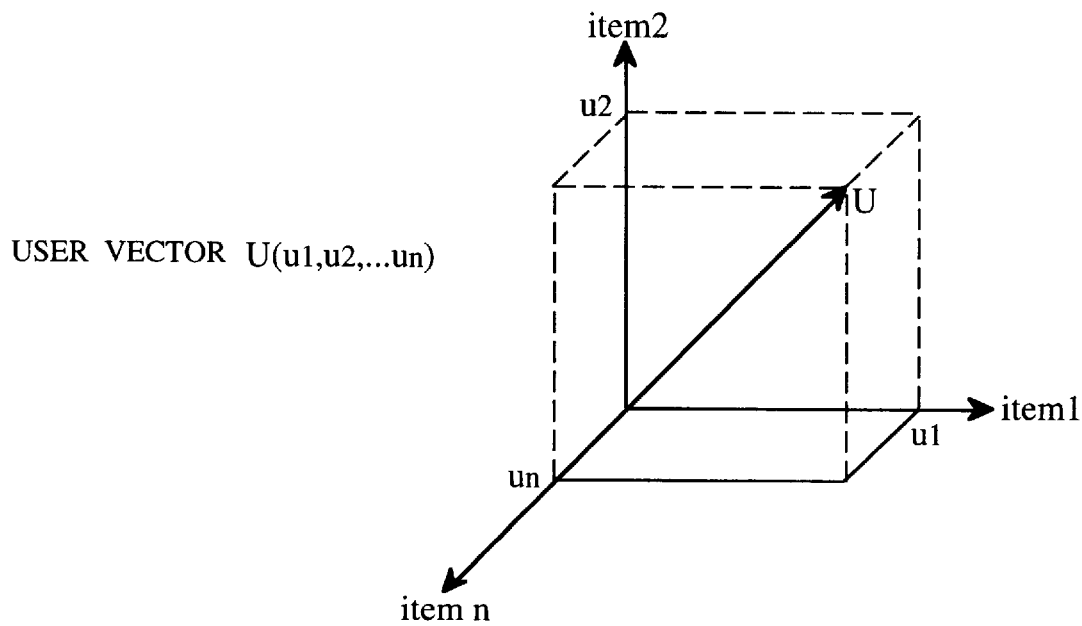
FIGS. 8A and 8B are diagrams showing another example of user attribute value and information attribute value in forms of user vector and information vector that can be used in the information providing system of FIG. 1.
Figure 8B:
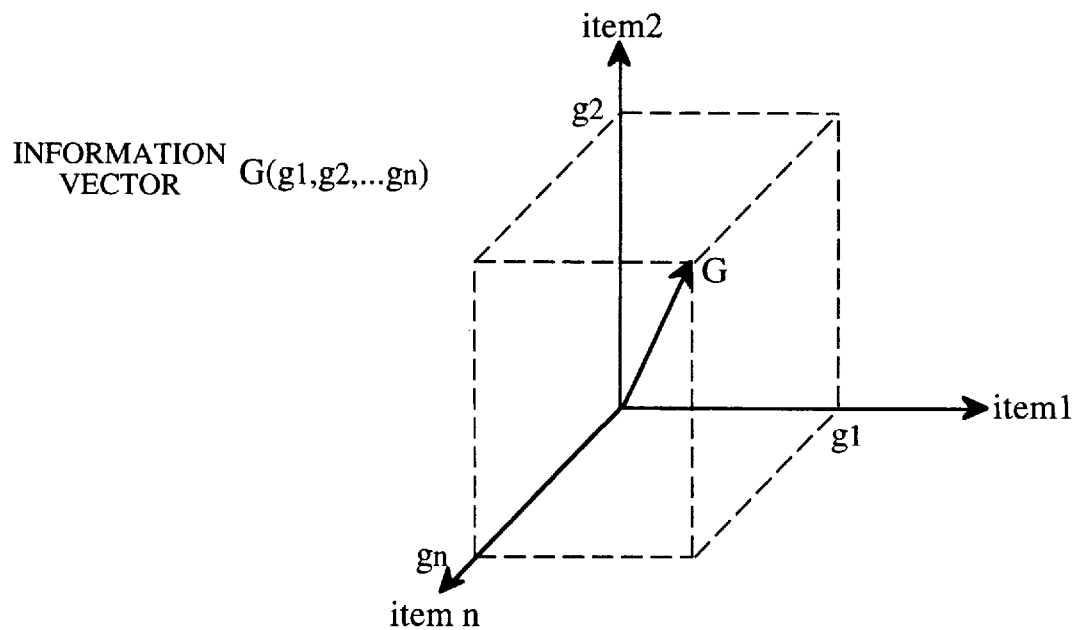

FIGS. 8A and 8B show exemplary configurations of a user vector and an information vector that can be used as the user attribute value and the information attribute value, respectively. Here, the user vector and the information vector are expressed as multi-dimensional vectors in which intensities of the user's interest and the information characteristic are set as weights with respect to a plurality of items taken as independent axes, where the user vector is denoted as $U(u1, u2, \ldots, un)$ while the information vector is denoted as $G(g1, g2, \ldots, gn)$. This notation indicates that the user vector U has a value u1 for the first item and the information vector G has a value g1 for the first item, and so on.

Next, with reference to FIGS. 9A, 9B and 9C, one example of a procedure for updating the user vector and the information vector of FIGS. 8A and 8B that can be used in the information providing system of FIG. 1 will be described.

The updating procedure shown in FIGS. 9A and 9B realizes the update basically by rotating these vectors so that their directions approach to each other. In FIGS. 9A and 9B, θ is an angle formed by the user vector U and the information vector G while C1 and C2 are coefficients, and the user vector U is rotated by an angle C1θ toward a direction approaching to the information vector G while the information vector G is rotated by an angle C2θ toward a direction approaching to the user vector U.

C1 is a coefficient in a range of 0<C1<1 which is incorporated in order to adjust a rate for rotating the user vector according to a type of information to be provided. In a case of dealing with a type of information with respect to which the user's interest is expected to be constant over a long term, a value of this coefficient C1 can be set to be small so that a change of the user vector becomes small.

C2 is a coefficient in a range of 0<C2<1 which is incorporated in order to adjust a rate for rotating the information vector, and which is to be set sufficiently small in order to prevent an unstable state in which the information vector changes largely every time the information is accessed by the user.

Note that a rigorous calculation of a vector rotation calls for a matrix calculation which requires a large computational load. For this reason, the actual calculation can be carried out as shown in FIG. 9C. Namely, in a case of updating the user vector U, using the coefficient C1 described above, an interior division point that divides a line segment joining the user vector U and the information vector G at a ratio of C1:1−C1 is obtained first. Then, a vector U' from an origin to this interior division point is formed as indicated in FIG. 9C. This vector U' has a length shorter than the original user vector U so that a new updated user vector Unew is obtained by applying an operation to extend the vector U' to an original length of the user vector U as indicated in FIG. 9C. The actual calculation in a case of updating the information vector G can be carried out similarly.

Note also that the user vector U and the information vector G appear to have different lengths in FIGS. 9A and 9B but this is due to the fact that these FIGS. 9A and 9B show two-dimensional depiction of multi-dimensional vectors, and the user vector U and the information vector G actually have the same length as shown in FIG. 9C.

In this manner, it is possible to dynamically update the user attribute value according to the user's interest while dynamically updating the information attribute value according to a change in the information characteristic.

Next, with reference to FIG. 10, one example of a procedure for selecting a set of information that suits the user's interest, from N pieces of information that can be provided, by using the user vector U of FIG. 8A, will be described.

Figure 10:
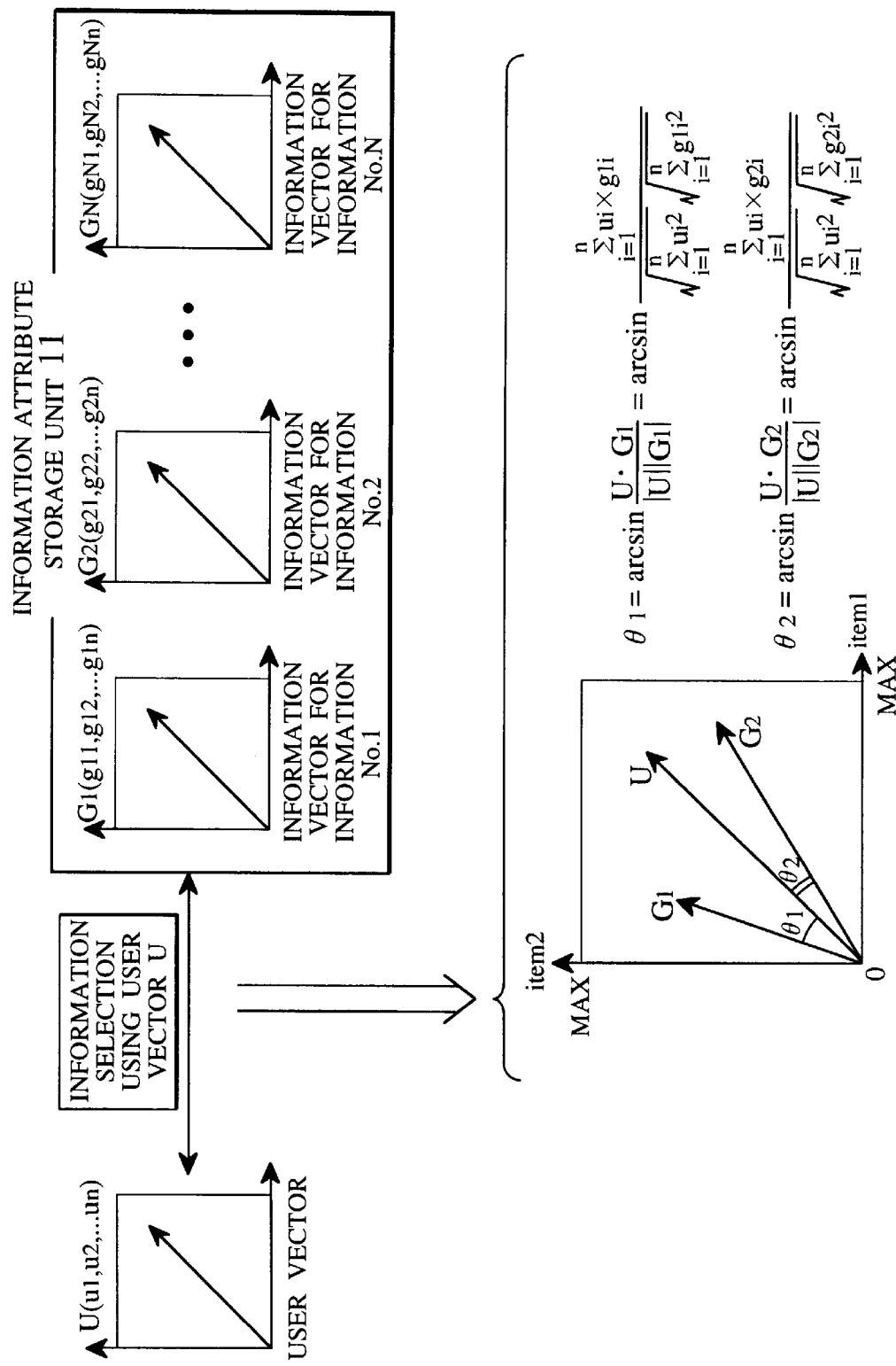
FIG. 10 is a diagram showing one example of a procedure for selecting information according to user vector of FIG. 8A that can be used in the information providing system of FIG. 1.

In the selection procedure shown in FIG. 10, the user vector and the information vector of each information are utilized in such a manner that an angle between the user vector and the information vector of each information is calculated by the vector space calculation as indicated in FIG. 10 for two examples, and then every information for which the calculated angle is smaller than a prescribed value is selected, or a set of a prescribed number of information in an increasing order of the calculated angle is selected. Note that the selection here may alternatively be made by selecting a prescribed number of information in an increasing order of the calculated angle out of those information for which the calculated angle is smaller than the prescribed value, or by selecting those information for which the calculated angle is smaller than the prescribed value out of a prescribed number of information in an increasing order of the calculated angle. In this manner, it is possible to select a set of information according to the user's interest.

Next, with reference to FIG. 11, one example of a procedure for selecting a set of information that is related to the information specified by the user, from N pieces of information that can be provided, by using the information vector G of FIG. 8B, will be described.

Figure 11:
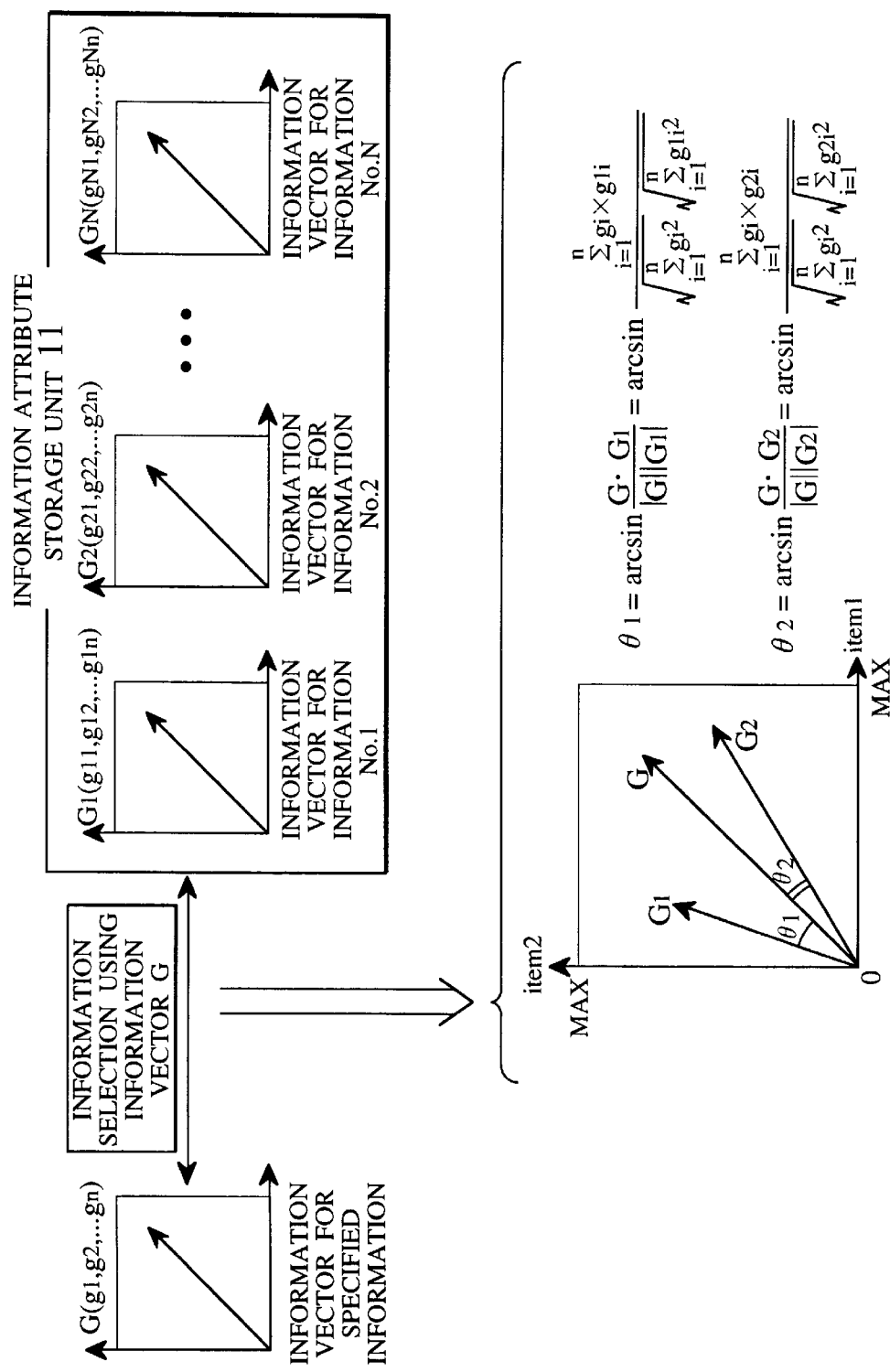
FIG. 11 is a diagram showing one example of a procedure for selecting information according to information vector of FIG. 8B that can be used in the information providing system of FIG. 1.

In the selection procedure shown in FIG. 11, the information vector of the specified information and the information vector of each other information are utilized in such a manner that an angle between the user vector of the specified information and the information vector of each other information is calculated by the vector space calculation as indicated in FIG. 11 for two examples, and then every information for which the calculated angle is smaller than a prescribed value is selected, or a set of a prescribed number of information in an increasing order of the calculated angle is selected. Note that the selection here may alternatively be made by selecting a prescribed number of information in an increasing order of the calculated angle out of those information for which the calculated angle is smaller than the prescribed value, or by selecting those information for which the calculated angle is smaller than the prescribed value out of a prescribed number of information in an increasing order of the calculated angle. In this manner, it is possible to select a set of information according to the user's interest.

Figure 12:
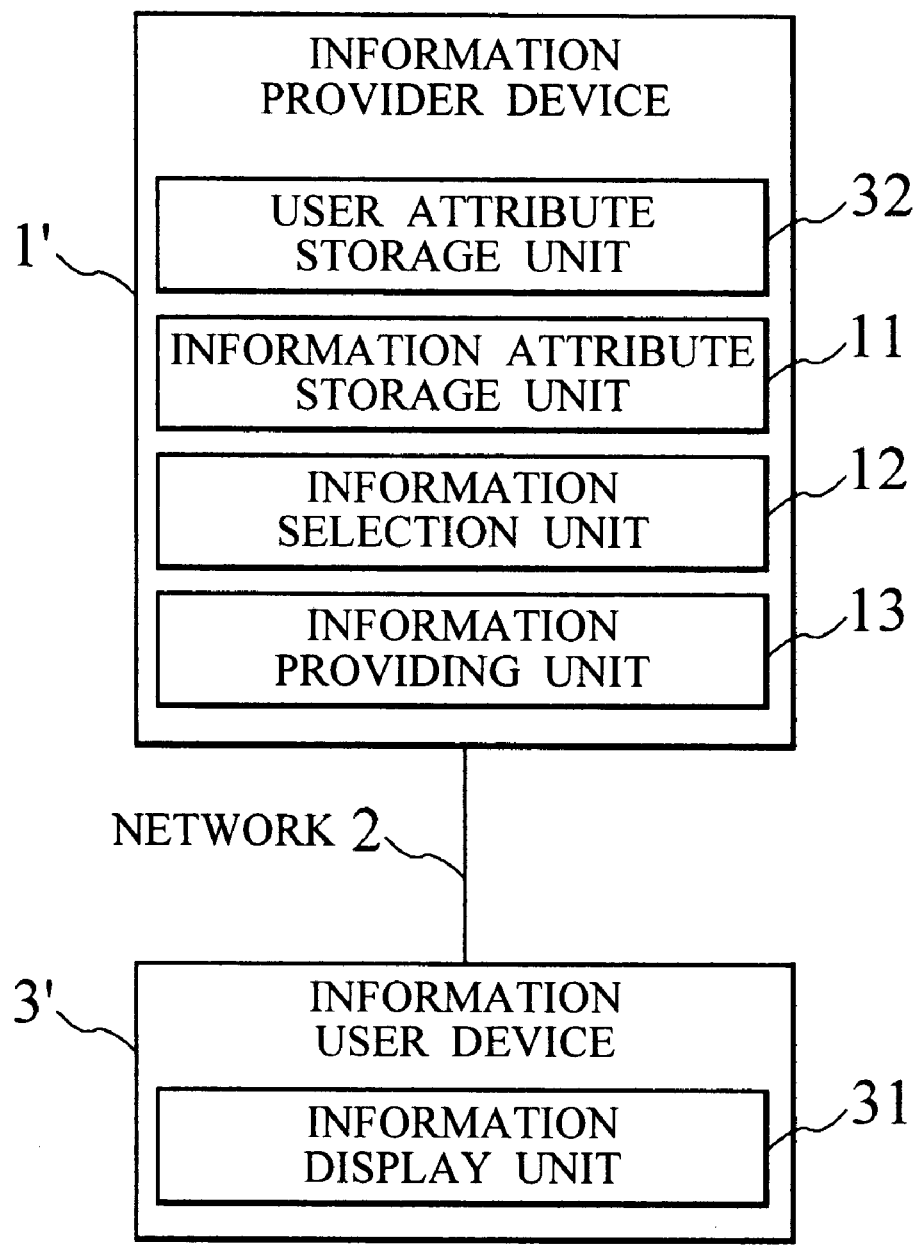
FIG. 12 is a block diagram of an information providing system for realizing an on-line information providing scheme according to the second embodiment of the present invention.
Figure 13:
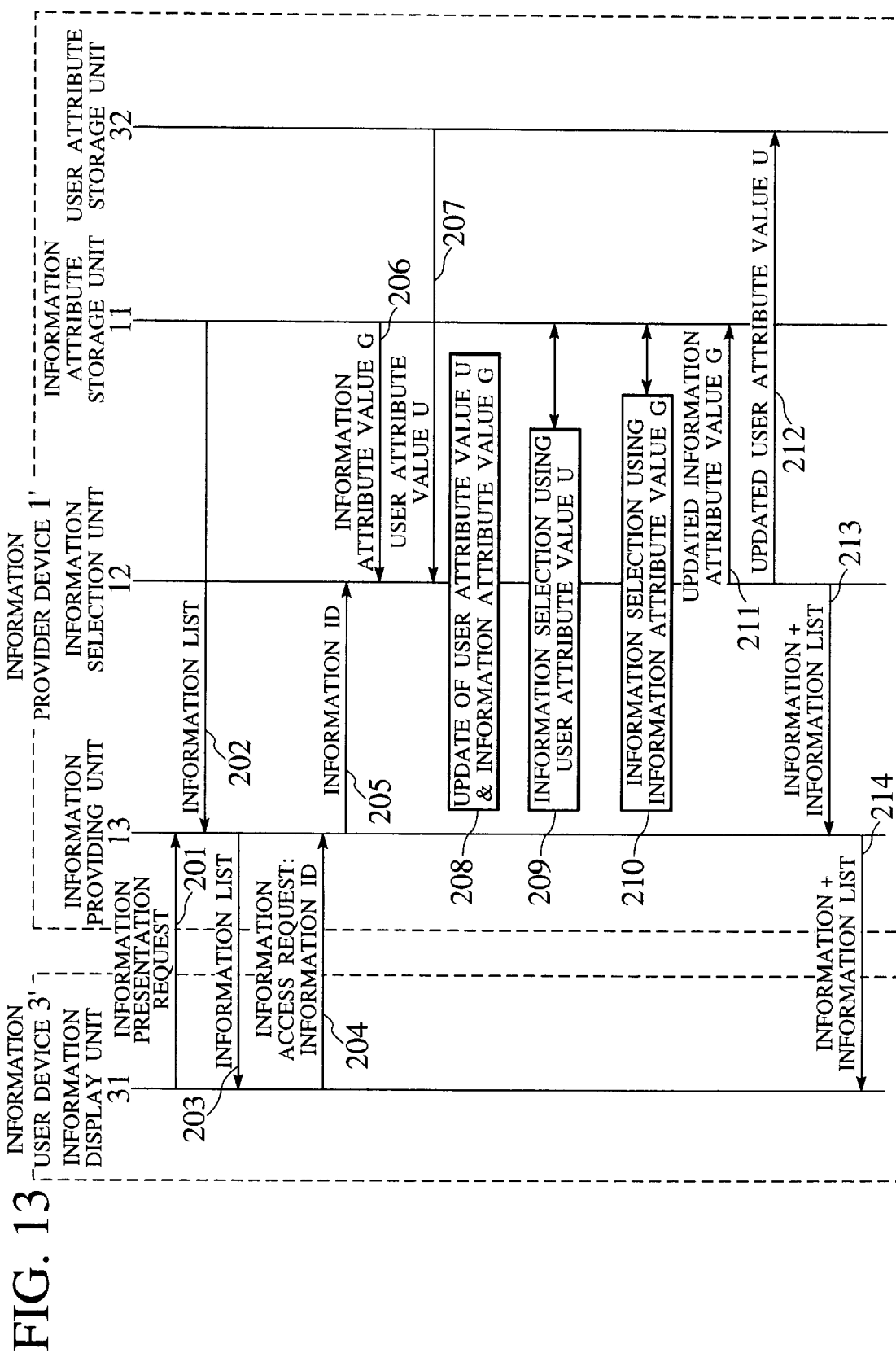
FIG. 13 is a sequence chart for the operation in the information providing system of FIG. 12.

Referring now to FIG. 12 and FIG. 13, the second embodiment of an on-line information providing scheme according to the present invention will be described in detail.

FIG. 12 shows a configuration of an information providing system for realizing an on-line information providing scheme according to the second embodiment, in which information presentation is to be provided on-line between an information provider device 1' located at an information provider side and an information user device 3' located at a user side which is connected with the information provider device 1' through a network 2.

The information provider device 1' comprises: a user attribute storage unit 32 for storing the user attribute value that indicates the user's interest with respect to information numerically; an information attribute storage unit 11 for storing various information including an information attribute value that indicates a characteristic of each information numerically and an information ID that identify each information; an information providing unit 13 for transmitting a list of information that can be provided in response to an information presentation request from the information user device 3', receiving an information ID transmitted from the information user device 3', and transmitting an information specified by the user and an information list selected according to the user's interest, to the information user device 3' through the network 2; and an information selection unit 12 for reading the user attribute value of the user who made an access to the information from the user attribute storage unit 32, reading the information attribute value corresponding to the information ID received at the information providing unit 13 from the information attribute storage unit 11, dynamically updating user's interest and information characteristic by updating the user attribute value and the information attribute value of the specified information in such a manner as to reflect the information attribute value and the user attribute value of the specified information with each other, and selecting a set of information according to the user's interest by matching the user attribute value and the information attribute value of the specified information with an information attribute value of each information.

The information user device 3' comprises an information display unit 31 for making an information presentation request to the information provider device 1' through the network 2, receiving a list of information transmitted from the information provider device 1' through the network 2 in response to the information presentation request, transmitting the information ID of an information to be accessed which is selected from the list of information to the information provider device 1' through the network 2, receiving the specified information and the information list that are transmitted from the information provider device 1' through the network 2, and displaying the specified information and the information list to the user.

Next, with reference to the sequence chart of FIG. 13, the operation in the information providing system of FIG. 12 will be described.

First, in order to make an access to an information, the user acquires the list of information provided from the information provider. To this end, the user requests the list of information from the information display unit 31 of the information user device 3' through the network 2 to the information providing unit 13 of the information provider device 1' (201). The information providing unit 13 receives this request and reads out from the information attribute storage unit 11 the list of information indicating information ID and description of each information that can be provided (202), and then returns this list of information to the information display unit 31 (203).

Next, the user determines an information to be accessed out of the list of information, and makes an information transmission request to the information provider. At this point, the information display unit 31 of the information user device 3' sends the information ID of an information to be accessed to the information providing unit 13 of the information provider device 1' (204).

The information providing unit 13 then gives the received information ID to the information selection unit 12 (205).

The information selection unit 12 obtains an information attribute value G of an information corresponding to the received information ID from the information attribute storage unit 11 (206) and obtains a user attribute value U of the user who made the information transmission request from the user attribute storage unit 32 (207). Then, the information selection unit 12 updates the user attribute value U that indicates the user's interest and the information attribute value G that indicates the information characteristic (208). This attribute value update is done by updating values set to items constituting these attribute values in such a manner as to reflect the user attribute value U and the information attribute value G of the specified information with each other, just as in the first embodiment described above.

Next, the information selection unit 12 selects a set of information that suits the user's interest, by using the updated user attribute value U (209). This information selection is done by selecting every information which has a distribution of values in the information attribute value that resembles the user attribute value U, just as in the first embodiment described above.

Next, the information selection unit 12 selects a set of information that is related to the specified information, by using the updated information attribute value G (210). This information selection is similarly done by selecting every information which has a distribution of values in the information attribute value that resembles the information attribute value G of the specified information, just as in the first embodiment described above.

In addition, the information selection unit 12 stores the updated information attribute value G into the information attribute storage unit 11 (211), and stores the updated user attribute value U into the user attribute storage unit 32 (212).

Then, the information specified by the user and the information list containing either one or both of the sets of information selected at the above described 209 and 210 are sent to the user from the information selection unit 12 through the information providing unit 13 and the information display unit 31 (213, 214).

Finally, the information display unit 31 displays the received information and information list to the user.

In this manner, it is possible to provide the user attribute storage unit 32 on the information provider device 1' side so as not to carry out the exchange of the user attribute value through the network 2.

As described above, according to the present invention, the information attribute value of the information accessed by the user is utilized in updating the user's interest. The user made access to a specific information because the user has a strong interest in that information, so that the information attribute value associated with this information can be said to indicate the user's interest. Consequently, the information attribute value of this information is reflected into the user attribute value that indicates the user's interest. By means of this, it becomes unnecessary for the user to register his/her own interest to the information provider prior to system utilization, and it becomes possible to dynamically account for the user's interest.

Also, the information to be accessed changes as the interest changes, so that it also becomes possible for the information provider to always account for the change in the user's interest. In addition, by storing the user attribute values of all the users, it becomes possible for the information provider to comprehend the trend of interests of the users as a whole, that is, the needs of the users as a whole.

On the other hand, the user attribute value of the user who made access to the information is utilized in characterizing the information. When some information is accessed by some user, the information attribute value of this information can be regarded as having a high correlation with the user attribute value of that user. Consequently, the user attribute value of that user is reflected into the information attribute value of that information so as to realize the dynamic information characterization. As the information attribute value of the information reflects user attribute values of a plurality of users who made accesses to the information, it becomes possible to characterize the information from a viewpoint of the users, so that it becomes possible to provide information which is more suitable for the users. In addition, the information provider can monitor the change in the information attribute value to judge which information suits what kind of user with what kind of interest, that is, to carry out the pre-marketing research.

Also, at a time of providing information presentation, it becomes possible to realize the information presentation according to the user's interest, by selecting the set of information which has the distribution of values in the information attribute value which resembles the user attribute value of the user. Similarly, it becomes possible to realize the information presentation of information related to the accessed information, that is, the information presentation according to the user's interest, by selecting the set of information which has the distribution of values in the information attribute value which resembles the information attribute value of the information accessed by the user.

Moreover, in the case of the first embodiment, the user attribute value is stored in the information user device and sent to the information provider device at every occasion of the information access request, while the user attribute value itself is formed by information indicating the user's interest alone without any information by which an individual user can be identified, so that it becomes possible to protect the privacy of the user.

Thus according to the present invention, the user attribute value that indicates the user's interest numerically is stored in the information user device while the information attribute value that indicates the information characteristic numerically is stored in the information provider device, and when the user makes an access to a specific information out of the list of information presented by the information provider through the information user device, the information ID and the user attribute value are sent to the information provider device. The information provider device updates the received user attribute value and the information attribute value corresponding to the received information ID by reflecting them each other in order to dynamically account for the user's interest and classify information, and then dynamically present information to the user according to the interest of the individual user. Consequently, it is possible to dynamically account for the change in the user's interest while dynamically classifying information at the same time, and it is possible to promote the utilization of the information providing system.

In addition, the user attribute value is automatically updated and then managed by the information user device at the user side, while the information attribute value is also automatically updated, so that it is possible to reduce the processing load on the information provider and it is possible to economize the information providing system.

Moreover, according to the present invention, at a time of transmitting the information ID of the information and the user attribute value of the user to the information provider device, no information that can identify the individual user is contained, so that the anonymity of the user can be maintained and therefore the privacy of the user can be protected.

It is to be noted that the above described embodiments according to the present invention may be conveniently implemented using conventional general purpose digital computers programmed according to the teachings of the present specification, as will be apparent to those skilled in the computer art. Appropriate software coding can readily be prepared by skilled programmers based on the teachings of the present disclosure, as will be apparent to those skilled in the software art.

In particular, the information provider device and the information user device in the information providing system of FIG. 1 and FIG. 12 described above can be conveniently implemented in forms of software packages either separately or collectively.

Such a software package can be a computer program product which employs a storage medium including stored computer code which is used to program a computer to perform the disclosed function and process of the present invention. The storage medium may include, but is not limited to, any type of conventional floppy disks, optical disks, CD-ROMs, magneto-optical disks, ROMs, RAMs, EPROMs, EEPROMs, magnetic or optical cards, or any other suitable media for storing electronic instructions.

It is also to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A method for providing information on-line between an information user device located at a user side and an information provider device located at an information provider side which is connected with the information user device through a network, the method comprising the steps of:

storing an information attribute value that indicates an information characteristic of each information numerically in correspondence to an information ID of each information in the information provider device;

sending an information ID of a specific information from the information user device to the information provider device in a case where a user makes an access through the information user device to the specific information selected out of a list of information presented by the information provider;

updating the information attribute value of the specific information corresponding to the information ID of the specific information and a user attribute value of the user that indicates a user's interest with respect to information numerically by reflecting the information attribute value and the user attribute value with each other so as to dynamically update the user's interest and an information characteristic of the specific information, upon receiving the information ID of the specific information at the information provider device;

selecting a first set of information according to the user's interest by matching an updated user attributed value with the information attribute value of each information at the information provider device, and a second set of information according to the user's interest by matching an updated information attribute value of the specific information with the information attribute value of each other information at the information provider device;

transmitting the specific information and an information list containing at least one of the first set of information and the second set of information from the information provider device to the information user device; and presenting the specific information and the information list to the user at the information user device upon receiving the specific information and the information list from the information provider device.

2. The method of claim 1, wherein the user attribute value and the information attribute value are expressed as histograms in which intensities of the user's interest and the information characteristic are set as values of a plurality of prescribed common items.

3. The method of claim 2, wherein the updating step dynamically updates the user attribute value according to the user's interest by adding the information attribute value of the specific information to the user attribute value of the user at a rate between 0% and 100% for each item.

4. The method of claim 2, wherein the updating step obtains an updated value for each item of the user attribute value as a value obtained by adding a value of each item of the user attribute value of the user multiplied by a first coefficient indicating a decline of interest and a value of each item of the information attribute value of the specific information multiplied by a second coefficient for preventing divergence.

5. The method of claim 2, wherein the updating step dynamically updates the information attribute value according to a change in the information characteristic by adding the user attribute value of the user to the information attribute value of the specific information at a rate between 0% and 100% for each item.

6. The method of claim 2, wherein the updating step obtains an updated value for each item of the information attribute value as a value obtained by adding a value of each item of the information attribute value of the specific information multiplied by a first coefficient indicating a staleness of information and a value of each item of the user attribute value of the user multiplied by a second coefficient for preventing divergence.

7. The method of claim 2, wherein the selecting step selects the first set of information according to the user's interest by multiplying the user attribute value of the user and the information attribute value of each information together item by item to obtain products for all items, summing the products for all items together to obtain a sum, and selecting those information for which the sum is greater than a prescribed value or a prescribed number of information in a decreasing order of the sum.

8. The method of claim 2, wherein the selecting step selects the second set of information according to the user's interest by multiplying the information attribute value of the specific information and the information attribute value of each other information together item by item to obtain products for all items, summing the products for all items together to obtain a sum, and selecting those information for which the sum is greater than a prescribed value or a prescribed number of information in a decreasing order of the sum.

9. The method of claim 1, wherein the user attribute value and the information attribute value are given in forms of a user vector and an information vector expressed as multi-dimensional vectors in which intensities of the user's interest and the information characteristic are set as weights with respect to a plurality of prescribed common items taken as independent axes.

10. The method of claim 9, wherein the updating step dynamically updates the user vector according to the user's interest by rotating the user vector of the user toward the information vector of the specific information within a multi-dimensional vector space.

11. The method of claim 9, wherein the updating step dynamically updates the information vector according to a change in the information characteristic by rotating the information vector of the specific information toward the user vector of the user within a multi-dimensional vector space.

12. The method of claim 9, wherein the selecting step selects the first set of information according to the user's interest by obtaining an angle between the user vector of the user and the information vector of each information according to vector space calculation, and selecting those information for which the angle is smaller than a prescribed value or a prescribed number of information in an increasing order of the angle.

13. The method of claim 9, wherein the selecting step selects the second set of information according to the user's interest by obtaining an angle between the information vector of the specific information and the information vector of each other information according to vector space calculation, and selecting those information for which the angle is smaller than a prescribed value or a prescribed number of information in an increasing order of the angle.

14. The method of claim 1, further comprising the step of:
storing the user attribute value in the information user device;
wherein the sending step sends the user attribute value from the information user device to the information provider device along with the information ID of the specific information;
the updating step updates the user attribute value received from the information user device and the transmitting step transmits the updated user attribute value to the information user device along with the specific information and the information list; and
the presenting step also updates the user attribute value stored in the information user device to the updated user attribute value transmitted from the information provider device.

15. The method of claim 14, wherein the sending step sends only the information ID of the specific information and the user attribute value which indicates the user's interest numerically without including any information for identifying the user to the information provider device, so as to protect privacy of the user.

16. A system for providing information on-line between an information user device located at a user side and an information provider device located at an information provider side which is connected with the information user device through a network, the system comprising:
the information user device having an information display unit for sending to the information provider device through the network an information ID of a specific information selected out of a list of information presented by the information provider, receiving the specific information and an information list selected according to a user's interest by the information provider device which are transmitted from the information provider device in response, and displaying the specific information and the information list to a user; and
the information provider device having:
an information attribute storage unit for storing an information attribute value that indicates an information characteristic of each information numerically in correspondence to an information ID of each information;
an information selection unit for reading from the information attribute storage unit an information attribute value of the specific information corresponding to the information ID of the specific information sent from the information user device, updating the information attribute value of the specific information and a user attribute value of the user that indicates a user's interest with respect to information numerically by reflecting the information attribute value and the user attribute value with each other so as to dynamically update the user's interest and an information characteristic of the specific information, selecting a first set of information according to the user's interest by matching an updated user attributed value with the information attribute value of each information, and selecting a second set of information according to the user's interest by matching an updated information attribute value of the specific information with the information attribute value of each other information; and an information providing unit for transmitting the specific information and the information list containing at least one of the first set of information and the second set of information to the information user device through the network.

17. The system of claim 16, wherein the information provider device uses the user attribute value and the information attribute value which are expressed as histograms in which intensities of the user's interest and the information characteristic are set as values of a plurality of prescribed common items.

18. The system of claim 17, wherein the information selection unit of the information provider device dynamically updates the user attribute value according to the user's interest by adding the information attribute value of the specific information to the user attribute value of the user at a rate between 0% and 100% for each item.

19. The system of claim 17, wherein the information selection unit of the information provider device obtains an updated value for each item of the user attribute value as a value obtained by adding a value of each item of the user attribute value of the user multiplied by a first coefficient indicating a decline of interest and a value of each item of the information attribute value of the specific information multiplied by a second coefficient for preventing divergence.

20. The system of claim 17, wherein the information selection unit of the information provider device dynamically updates the information attribute value according to a change in the information characteristic by adding the user attribute value of the user to the information attribute value of the specific information at rate between 0% and 100% for each item.

21. The system of claim 17, wherein the information selection unit of the information provider device obtains an updated value for each item of the information attribute value as a value obtained by adding a value of each item of the information attribute value of the specific information multiplied by a first coefficient indicating a staleness of information and a value of each item of the user attribute value of the user multiplied by a second coefficient for preventing divergence.

22. The system of claim 17, wherein the information selection unit of the information provider device selects the first set of information according to the user's interest by multiplying the user attribute value of the user and the information attribute value of each information together item by item to obtain products for all items, summing the products for all items together to obtain a sum, and selecting those information for which the sum is greater than a prescribed value or a prescribed number of information in a decreasing order of the sum.

23. The system of claim 17, wherein the information selection unit of the information provider device selects the second set of information according to the user's interest by multiplying the information attribute value of the specific information and the information attribute value of each other information together item by item to obtain products for all items, summing the products for all items together to obtain a sum, and selecting those information for which the sum is greater than a prescribed value or a prescribed number of information in a decreasing order of the sum.

24. The system of claim 16, wherein the information provider device uses the user attribute value and the information attribute value which are given in forms of a user vector and an information vector expressed as multi-dimensional vectors in which intensities of the user's interest and the information characteristic are set as weights with respect to a plurality of prescribed common items taken as independent axes.

25. The system of claim 24, wherein the information selection unit of the information provider device dynamically updates the user vector according to the user's interest by rotating the user vector of the user toward the information vector of the specific information within a multi-dimensional vector space.

26. The system of claim 24, wherein the information selection unit of the information provider device dynamically updates the information vector according to a change in the information characteristic by rotating the information vector of the specific information toward the user vector of the user within a multi-dimensional vector space.

27. The system of claim 24, wherein the information selection unit of the information provider device selects the first set of information according to the user's interest by obtaining an angle between the user vector of the user and the information vector of each information according to vector space calculation, and selecting those information for which the angle is smaller than a prescribed value or a prescribed number of information in an increasing order of the angle.

28. The system of claim 24, wherein the information selection unit of the information provider device selects the second set of information according to the user's interest by obtaining an angle between the information vector of the specific information and the information vector of each other information according to vector space calculation, and selecting those information for which the angle is smaller than a prescribed value or a prescribed number of information in an increasing order of the angle.

29. The system of claim 16, wherein the information user device further includes a user attribute storage unit for storing the user attribute value;

wherein the information display unit of the information user device sends the user attribute value to the information provider device along with the information ID of the specific information;

the information selection unit of the information provider device updates the user attribute value received from the information user device and the information providing unit of the information provider device transmits the updated user attribute value to the information user device along with the specific information and the information list; and the user attribute storage unit of the information user device updates the user attribute value stored therein to the updated user attribute value transmitted from the information provider device.

30. The system of claim 29, wherein the information display unit of the information user device sends only the information ID of the specific information and the user attribute value which indicates the user's interest numerically without including any information for identifying the user to the information provider device, so as to protect privacy of the user.

31. An article of manufacture, comprising:

a computer usable medium having computer readable program code means embodied therein for causing a computer to function as a system for providing information on-line between an information user device located at a user side and an information provider device located at an information provider side which is connected with the information user device through a network, the computer readable program code means includes:

first computer readable program code means for causing said computer to control the information user device such that the information user device sends to the information provider device through the network an information ID of a specific information selected out of a list of information presented by the information provider, receives the specific information and an information list selected according to a user's interest by the information provider device which are transmitted from the information provider device in response, and displays the specific information and the information list to a user; and second computer readable program code means for causing said computer to control the information provider device such that the information provider device stores an information attribute value that indicates an information characteristic of each information numerically in correspondence to an information ID of each information, reads an information attribute value of the specific information corresponding to the information ID of the specific information sent from the information user device, updates the information attribute value of the specific information and a user attribute value of the user that indicates a user's interest with respect to information numerically by reflecting the information attribute value and the user attribute value with each other so as to dynamically update the user's interest and an information characteristic of the specific information, selects a first set of information according to the user's interest by matching an updated user attributed value with the information attribute value of each information, selects a second set of information according to the user's interest by matching an updated information attribute value of the specific information with the information attribute value of each other information, and transmits the specific information and the information list containing at least one of the first set of information and the second set of information to the information user device through the network.

32. The article of manufacture of claim 31, wherein the second computer readable program code means uses the user attribute value and the information attribute value which are expressed as histograms in which intensities of the user's interest and the information characteristic are set as values of a plurality of prescribed common items.

33. The article of manufacture of claim 32, wherein the second computer readable program code means dynamically updates the user attribute value according to the user's interest by adding the information attribute value of the specific information to the user attribute value of the user at a rate between 0% and 100% for each item.

34. The article of manufacture of claim 32, wherein the second computer readable program code means obtains an updated value for each item of the user attribute value as a value obtained by adding a value of each item of the user attribute value of the user multiplied by a first coefficient indicating a decline of interest and a value of each item of the information attribute value of the specific information multiplied by a second coefficient for preventing divergence.

35. The article of manufacture of claim 32, wherein the second computer readable program code means dynamically updates the information attribute value according to a change in the information characteristic by adding the user attribute value of the user to the information attribute value of the specific information at a rate between 0% and 100% for each item.

36. The article of manufacture of claim 32, wherein the second computer readable program code means obtains an updated value for each item of the information attribute value as a value obtained by adding a value of each item of the information attribute value of the specific information multiplied by a first coefficient indicating a staleness of information and a value of each item of the user attribute value of the user multiplied by a second coefficient for preventing divergence.

37. The article of manufacture of claim 32, wherein the second computer readable program code means selects the first set of information according to the user's interest by multiplying the user attribute value of the user and the information attribute value of each information together item by item to obtain products for all items, summing the products for all items together to obtain a sum, and selecting those information for which the sum is greater than a prescribed value or a prescribed number of information in a decreasing order of the sum.

38. The article of manufacture of claim 32, wherein the second computer readable program code means selects the second set of information according to the user's interest by multiplying the information attribute value of the specific information and the information attribute value of each other information together item by item to obtain products for all items, summing the products for all items together to obtain a sum, and selecting those information for which the sum is greater than a prescribed value or a prescribed number of information in a decreasing order of the sum.

39. The article of manufacture of claim 31, wherein the second computer readable program code means uses the user attribute value and the information attribute value which are given in forms of a user vector and an information vector expressed as multi-dimensional vectors in which intensities of the user's interest and the information characteristic are set as weights with respect to a plurality of prescribed common items taken as independent axes.

40. The article of manufacture of claim 39, wherein the second computer readable program code means dynamically updates the user vector according to the user's interest by rotating the user vector of the user toward the information vector of the specific information within a multi-dimensional vector space.

41. The article of manufacture of claim 39, wherein the second computer readable program code means dynamically updates the information vector according to a change in the information characteristic by rotating the information vector of the specific information toward the user vector of the user within a multi-dimensional vector space.

42. The article of manufacture of claim 39, wherein the second computer readable program code means selects the first set of information according to the user's interest by obtaining an angle between the user vector of the user and the information vector of each information according to vector space calculation, and selecting those information for which the angle is smaller than a prescribed value or a prescribed number of information in an increasing order of the angle.

43. The article of manufacture of claim 39, wherein the second computer readable program code means selects the second set of information according to the user's interest by obtaining an angle between the information vector of the specific information and the information vector of each other information according to vector space calculation, and selecting those information for which the angle is smaller than a prescribed value or a prescribed number of information in an increasing order of the angle.

44. The article of manufacture of claim 31, wherein the first computer readable program code means also controls the information user device to store the user attribute value and send the user attribute value to the second computer readable program code means along with the information ID of the specific information;

the second computer readable program code means also controls the information provider device to update the user attribute value received from the information user device and transmit the updated user attribute value to the information user device along with the specific information and the information list; and the first computer readable program code means also controls the information user device to update the user attribute value stored therein to the updated user attribute value transmitted from the information provider device.

45. The article of manufacture of claim 44, wherein the first computer readable program code means sends only the information ID of the specific information and the user attribute value which indicates the user's interest numerically without including any information for identifying the user to the information provider device, so as to protect privacy of the user.

46. A method for providing information at an information providing device at a time of providing information on-line between an information user device located at a user side and the information provider device located at an information provider side which is connected with the information user device through a network, the method comprising the steps of:

storing an information attribute value that indicates an information characteristic of each information numerically in correspondence to an information ID of each information;

receiving an information ID of a specific information sent from the information user device to the information provider device in a case where a user makes an access through the information user device to the specific information selected out of a list of information presented by the information provider;

updating the information attribute value of the specific information corresponding to the information ID of the specific information and a user attribute value of the user that indicates a user's interest with respect to information numerically by reflecting the information attribute value and the user attribute value with each other so as to dynamically update the user's interest and an information characteristic of the specific information;

selecting a first set of information according to the user's interest by matching an updated user attributed value with the information attribute value of each information, and a second set of information according to the user's interest by matching an updated information attribute value of the specific information with the information attribute value of each other information; and transmitting the specific information and an information list containing at least one of the first set of information and the second set of information from the information provider device to the information user device.

47. The method of claim 46, wherein the user attribute value and the information attribute value are expressed as histograms in which intensities of the user's interest and the information characteristic are set as values of a plurality of prescribed common items.

48. The method of claim 47, wherein the updating step dynamically updates the user attribute value according to the user's interest by adding the information attribute value of the specific information to the user attribute value of the user at a rate between 0% and 100% for each item.

49. The method of claim 47, wherein the updating step obtains an updated value for each item of the user attribute value as a value obtained by adding a value of each item of the user attribute value of the user multiplied by a first coefficient indicating a decline of interest and a value of each item of the information attribute value of the specific information multiplied by a second coefficient for preventing divergence.

50. The method of claim 47, wherein the updating step dynamically updates the information attribute value according to a change in the information characteristic by adding the user attribute value of the user to the information attribute value of the specific information at a rate between 0% and 100% for each item.

51. The method of claim 47, wherein the updating step obtains an updated value for each item of the information attribute value as a value obtained by adding a value of each item of the information attribute value of the specific information multiplied by a first coefficient indicating a staleness of information and a value of each item of the user attribute value of the user multiplied by a second coefficient for preventing divergence.

52. The method of claim 47, wherein the selecting step selects the first set of information according to the user's interest by multiplying the user attribute value of the user and the information attribute value of each information together item by item to obtain products for all items, summing the products for all items together to obtain a sum, and selecting those information for which the sum is greater than a prescribed value or a prescribed number of information in a decreasing order of the sum.

53. The method of claim 47, wherein the selecting step selects the second set of information according to the user's interest by multiplying the information attribute value of the specific information and the information attribute value of each other information together item by item to obtain products for all items, summing the products for all items together to obtain a sum, and selecting those information for which the sum is greater than a prescribed value or a prescribed number of information in a decreasing order of the sum.

54. The method of claim 46, wherein the user attribute value and the information attribute value are given in forms of a user vector and an information vector expressed as multi-dimensional vectors in which intensities of the user's interest and the information characteristic are set as weights with respect to a plurality of prescribed common items taken as independent axes.

55. The method of claim 54, wherein the updating step dynamically updates the user vector according to the user's interest by rotating the user vector of the user toward the information vector of the specific information within a multi-dimensional vector space.

56. The method of claim 54, wherein the updating step dynamically updates the information vector according to a change in the information characteristic by rotating the information vector of the specific information toward the user vector of the user within a multi-dimensional vector space.

57. The method of claim 54, wherein the selecting step selects the first set of information according to the user's interest by obtaining an angle between the user vector of the user and the information vector of each information according to vector space calculation, and selecting those information for which the angle is smaller than a prescribed value or a prescribed number of information in an increasing order of the angle.

58. The method of claim 54, wherein the selecting step selects the second set of information according to the user's interest by obtaining an angle between the information vector of the specific information and the information vector of each other information according to vector space calculation, and selecting those information for which the angle is smaller than a prescribed value or a prescribed number of information in an increasing order of the angle.

59. The method of claim 46, wherein the user attribute value is stored in the information user device and the user attribute value is sent from the information user device to the information provider device along with the information ID of the specific information; and the updating step updates the user attribute value received from the information user device and the transmitting step transmits the updated user attribute value to the information user device along with the specific information and the information list, so that the information user device updates the user attribute value stored therein to the updated user attribute value transmitted from the information provider device.

60. An information provider device in a system for providing information on-line between an information user device located at a user side and the information provider device located at an information provider side which is connected with the information user device through a network, the information provider device comprising:

an information attribute storage unit for storing an information attribute value that indicates an information characteristic of each information numerically in correspondence to an information ID of each information;

an information selection unit for reading from the information attribute storage unit an information attribute value of the specific information corresponding to an information ID of the specific information sent from the information user device to the information provider device in a case where a user makes an access through the information user device to the specific information selected out of a list of information presented by the information provider, updating the information attribute value of the specific information and a user attribute value of the user that indicates a user's interest with respect to information numerically by reflecting the information attribute value and the user attribute value with each other so as to dynamically update the user's interest and an information characteristic of the specific information, selecting a first set of information according to the user's interest by matching an updated user attributed value with the information attribute value of each information, and selecting a second set of information according to the user's interest by matching an updated information attribute value of the specific information with the information attribute value of each other information; and an information providing unit for transmitting the specific information and the information list containing at least one of the first set of information and the second set of information selected by the information selection unit to the information user device through the network.

61. The information provider device of claim 60, wherein the information provider device uses the user attribute value and the information attribute value which are expressed as histograms in which intensities of the user's interest and the information characteristic are set as values of a plurality of prescribed common items.

62. The information provider device of claim 61, wherein the information selection unit dynamically updates the user attribute value according to the user's interest by adding the information attribute value of the specific information to the user attribute value of the user at a rate between 0% and 100% for each item.

63. The information provider device of claim 61, wherein the information selection unit obtains an updated value for each item of the user attribute value as a value obtained by adding a value of each item of the user attribute value of the user multiplied by a first coefficient indicating a decline of interest and a value of each item of the information attribute value of the specific information multiplied by a second coefficient for preventing divergence.

64. The information provider device of claim 61, wherein the information selection unit dynamically updates the information attribute value according to a change in the information characteristic by adding the user attribute value of the user to the information attribute value of the specific information at a rate between 0% and 100% for each item.

65. The information provider device of claim 61, wherein the information selection unit obtains an updated value for each item of the information attribute value as a value obtained by adding a value of each item of the information attribute value of the specific information multiplied by a first coefficient indicating a staleness of information and a value of each item of the user attribute value of the user multiplied by a second coefficient for preventing divergence.

66. The information provider device of claim 61, wherein the information selection unit selects the first set of information according to the user's interest by multiplying the user attribute value of the user and the information attribute value of each information together item by item to obtain products for all items, summing the products for all items together to obtain a sum, and selecting those information for which the sum is greater than a prescribed value or a prescribed number of information in a decreasing order of the sum.

67. The information provider device of claim 61, wherein the information selection unit selects the second set of information according to the user's interest by multiplying the information attribute value of the specific information and the information attribute value of each other information together item by item to obtain products for all items, summing the products for all items together to obtain a sum, and selecting those information for which the sum is greater than a prescribed value or a prescribed number of information in a decreasing order of the sum.

68. The information provider device of claim 60, wherein the information provider device uses the user attribute value and the information attribute value which are given in forms of a user vector and an information vector expressed as multi-dimensional vectors in which intensities of the user's interest and the information characteristic are set as weights with respect to a plurality of prescribed common items taken as independent axes.

69. The information provider device of claim 68, wherein the information selection unit dynamically updates the user vector according to the user's interest by rotating the user vector of the user toward the information vector of the specific information within a multi-dimensional vector space.

70. The information provider device of claim 68, wherein the information selection unit dynamically updates the information vector according to a change in the information characteristic by rotating the information vector of the specific information toward the user vector of the user within a multi-dimensional vector space.

71. The information provider device of claim 68, wherein the information selection unit selects the first set of information according to the user's interest by obtaining an angle between the user vector of the user and the information vector of each information according to vector space calculation, and selecting those information for which the angle is smaller than a prescribed value or a prescribed number of information in an increasing order of the angle.

72. The information provider device of claim 68, wherein the information selection unit selects the second set of information according to the user's interest by obtaining an angle between the information vector of the specific information and the information vector of each other information according to vector space calculation, and selecting those information for which the angle is smaller than a prescribed value or a prescribed number of information in an increasing order of the angle.

73. The information provider device of claim 60, wherein the information user device stores the user attribute value, and sends the user attribute value to the information provider device along with the information ID of the specific information; and the information selection unit updates the user attribute value received from the information user device and the information providing unit transmits the updated user attribute value to the information user device along with the specific information and the information list, so that the information user device updates the user attribute value stored therein to the updated user attribute value transmitted from the information provider device.

74. An article of manufacture, comprising:

a computer usable medium having computer readable program code means embodied therein for causing a computer to function as an information provider device in a system for providing information on-line between an information user device located at a user side and the information provider device located at an information provider side which is connected with the information user device through a network, the computer readable program code means includes:

first computer readable program code means for causing said computer to store an information attribute value that indicates an information characteristic of each information numerically in correspondence to an information ID of each information;

second computer readable program code means for causing said computer to read an information attribute value of the specific information as stored by the first computer readable program code means which is corresponding to an information ID of the specific information sent from the information user device to the information provider device in a case where a user makes an access through the information user device to the specific information selected out of a list of information presented by the information provider, update the information attribute value of the specific information and a user attribute value of the user that indicates a user's interest with respect to information numerically by reflecting the information attribute value and the user attribute value with each other so as to dynamically update the user's interest and an information characteristic of the specific information, select a first set of information according to the user's interest by matching an updated user attributed value with the information attribute value of each information, and select a second set of information according to the user's interest by matching an updated information attribute value of the specific information with the information attribute value of each other information; and third computer readable program code means for causing said computer to transmit the specific information and the information list containing at least one of the first set of information and the second set of information selected by the second computer readable program code means to the information user device through the network.

75. The article of manufacture of claim 74, wherein the computer readable program code means uses the user attribute value and the information attribute value which are expressed as histograms in which intensities of the user's interest and the information characteristic are set as values of a plurality of prescribed common items.

76. The article of manufacture of claim 75, wherein the second computer readable program code means dynamically updates the user attribute value according to the user's interest by adding the information attribute value of the specific information to the user attribute value of the user at a rate between 0% and 100% for each item.

77. The article of manufacture of claim 75, wherein the second computer readable program code means obtains an updated value for each item of the user attribute value as a value obtained by adding a value of each item of the user attribute value of the user multiplied by a first coefficient indicating a decline of interest and a value of each item of the information attribute value of the specific information multiplied by a second coefficient for preventing divergence.

78. The article of manufacture of claim 75, wherein the second computer readable program code means dynamically updates the information attribute value according to a change in the information characteristic by adding the user attribute value of the user to the information attribute value of the specific information at a rate between 0% and 100% for each item.

79. The article of manufacture of claim 75, wherein the second computer readable program code means obtains an updated value for each item of the information attribute value as a value obtained by adding a value of each item of the information attribute value of the specific information multiplied by a first coefficient indicating a staleness of information and a value of each item of the user attribute value of the user multiplied by a second coefficient for preventing divergence.

80. The article of manufacture of claim 75, wherein the second computer readable program code means selects the first set of information according to the user's interest by multiplying the user attribute value of the user and the information attribute value of each information together item by item to obtain products for all items, summing the products for all items together to obtain a sum, and selecting those information for which the sum is greater than a prescribed value or a prescribed number of information in a decreasing order of the sum.

81. The article of manufacture of claim 75, wherein the second computer readable program code means selects the second set of information according to the user's interest by multiplying the information attribute value of the specific information and the information attribute value of each other information together item by item to obtain products for all items, summing the products for all items together to obtain a sum, and selecting those information for which the sum is greater than a prescribed value or a prescribed number of information in a decreasing order of the sum.

82. The article of manufacture of claim 74, wherein the computer readable program code means uses the user attribute value and the information attribute value which are given in forms of a user vector and an information vector expressed as multi-dimensional vectors in which intensities of the user's interest and the information characteristic are set as weights with respect to a plurality of prescribed common items taken as independent axes.

83. The article of manufacture of claim 82, wherein the second computer readable program code means dynamically updates the user vector according to the user's interest by rotating the user vector of the user toward the information vector of the specific information within a multi-dimensional vector space.

84. The article of manufacture of claim 82, wherein the second computer readable program code means dynamically updates the information vector according to a change in the information characteristic by rotating the information vector of the specific information toward the user vector of the user within a multi-dimensional vector space.

85. The article of manufacture of claim 82, wherein the second computer readable program code means selects the first set of information according to the user's interest by obtaining an angle between the user vector of the user and the information vector of each information according to vector space calculation, and selecting those information for which the angle is smaller than a prescribed value or a prescribed number of information in an increasing order of the angle.

86. The article of manufacture of claim 82, wherein the second computer readable program code means selects the second set of information according to the user's interest by obtaining an angle between the information vector of the specific information and the information vector of each other information according to vector space calculation, and selecting those information for which the angle is smaller than a prescribed value or a prescribed number of information in an increasing order of the angle.

87. The article of manufacture of claim 74, wherein the information user device stores the user attribute value and sends the user attribute value to the information provider device along with the information ID of the specific information; and the second computer readable program code means updates the user attribute value received from the information user device and the third computer readable program code means transmits the updated user attribute value to the information user device along with the specific information and the information list, so that the information user device updates the user attribute value stored therein to the updated user attribute value transmitted from the information provider device.

\* \* \* \* \*